US011514595B2

(12) United States Patent
Sato et al.

(10) Patent No.: US 11,514,595 B2
(45) Date of Patent: Nov. 29, 2022

(54) DEPTH ACQUISITION DEVICE AND DEPTH ACQUISITION METHOD INCLUDING ESTIMATING A DEPTH OF A DUST REGION BASED ON A VISIBLE LIGHT IMAGE

(71) Applicant: Panasonic Intellectual Property Management Co., Ltd., Osaka (JP)

(72) Inventors: Satoshi Sato, Kyoto (JP); Takeo Azuma, Kyoto (JP); Nobuhiko Wakai, Tokyo (JP); Kohsuke Yoshioka, Osaka (JP); Noritaka Shimizu, Osaka (JP); Yoshinao Kawai, Kyoto (JP); Takaaki Amada, Kyoto (JP); Yoko Kawai, Osaka (JP); Takeshi Murai, Kyoto (JP); Hiroki Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/157,175

(22) Filed: Jan. 25, 2021

(65) Prior Publication Data

US 2021/0142496 A1 May 13, 2021

Related U.S. Application Data

(63) Continuation of application No. PCT/JP2019/033601, filed on Aug. 28, 2019.

(30) Foreign Application Priority Data

Sep. 18, 2018 (JP) .............................. JP2018-174276

(51) Int. Cl.
*G06T 7/50* (2017.01)
*G06T 7/521* (2017.01)

(52) U.S. Cl.
CPC .... *G06T 7/521* (2017.01); *G06T 2207/10028* (2013.01); *G06T 2207/20081* (2013.01)

(58) Field of Classification Search
CPC ..................... G01S 17/89; G01S 7/497; G06T 2207/10016; G06T 2207/10024;
(Continued)

(56) References Cited

U.S. PATENT DOCUMENTS 9,234,618 B1    1/2016 Zhu et al.
2012/0177252 A1    7/2012 Korekado et al.
(Continued)

FOREIGN PATENT DOCUMENTS

JP    2011-64498    3/2011
JP    2017-223648    12/2017

OTHER PUBLICATIONS

Telops "Direct Imaging of Shale Gas Leaks Using Passive Thermal Infrared Hyperspectral Imaging", 2017.*
(Continued)

*Primary Examiner* — James T Boylan
(74) *Attorney, Agent, or Firm* — Wenderoth, Lind & Ponack, LLP

(57) ABSTRACT

A depth acquisition device includes a memory and a processor. The processor performs; acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as that of the infrared light image, with visible light from a substantially same viewpoint and at a substantially same imaging time of those of the infrared
(Continued)

light image; detecting a dust region showing dust from the infrared light image; and estimating a depth of the dust region based on the infrared light image, the visible light image, and the dust region.

7 Claims, 29 Drawing Sheets

(58) Field of Classification Search
CPC . G06T 2207/10028; G06T 2207/10048; G06T 2207/20028; G06T 2207/20081; G06T 2207/20084; G06T 5/50; G06T 7/246; G06T 7/521; G06T 7/55
See application file for complete search history.

(56) References Cited

U.S. PATENT DOCUMENTS

| | | | |
|---|---|---|---|
| 2014/0168431 A1* | 6/2014 | Goto | G06V 40/23 348/143 |
| 2014/0240467 A1* | 8/2014 | Petyushko | H04N 13/128 348/47 |
| 2016/0097713 A1* | 4/2016 | Kester | G01N 21/3504 356/51 |
| 2017/0193296 A1* | 7/2017 | Duong | G06V 10/454 |
| 2017/0272651 A1* | 9/2017 | Mathy | H04N 13/257 |
| 2018/0003807 A1* | 1/2018 | Galera | G01S 17/10 |
| 2018/0232947 A1 | 8/2018 | Nehmadi et al. | |
| 2020/0258267 A1* | 8/2020 | Asano | G01M 3/38 |
| 2021/0126582 A1* | 4/2021 | Shue | B64C 39/024 |
| 2022/0011680 A1* | 1/2022 | Kiers | G01N 21/9501 |

OTHER PUBLICATIONS

Wang et al. "Machine Vision for Natural Gas Methane Emissions Detection Using an Infrared Camera", Apr. 1, 2019.*
International Search Report dated Nov. 12, 2019 in International (PCT) Application No. PCT/JP2019/033601.
R. Tsai, "A Versatile Camera Calibration Technique for High-Accuracy 3D Machine Vision Metrology Using Off-the-Shelf TV Cameras and Lenses", IEEE Journal of Robotics and Automation, vol. 3, No. 4, Aug. 1987, pp. 323-344.
Kaiming He et al., "Guided Image Filtering", IEEE Transactions on Pattern Analysis and Machine Intelligence, vol. 35, No. 6, Jun. 2013, pp. 1397-1409.
C. Tomasi et al., "Bilateral Filtering for Gray and Color Images", IEEE International Conference on Computer Vision (ICCV-98), 1998, pp. 839-846.
Xiaoyong Shen et al., "Mutual-Structure for Joint Filtering", IEEE International Conference on Computer Vision (ICCV 2015), 2015.
Shuran Song et al., "Semantic Scene Completion from a Single Depth Image", IEEE Conference on Computer Vision and Pattern Recognition, 2017, pp. 190-198.
Caner Hazirbas et al., "Deep Depth From Focus", arXiv:1704.01085v1 [cs.CV], Apr. 2017.
Extended European Search Report dated Oct. 13, 2021 in corresponding European Patent Application No. 19861674.0.

* cited by examiner

FIG. 2

| | | | | |
|---|---|---|---|---|
| IR | IR | IR | IR | ... |
| BW | BW | BW | BW | ... |
| IR | IR | IR | IR | ... |
| BW | BW | BW | BW | ... |
| ⋮ | ⋮ | ⋮ | ⋮ | |

DEPTH ACQUISITION DEVICE AND DEPTH ACQUISITION METHOD INCLUDING ESTIMATING A DEPTH OF A DUST REGION BASED ON A VISIBLE LIGHT IMAGE

CROSS REFERENCE TO RELATED APPLICATIONS

This application is a U.S. continuation application of PCT International Patent Application Number PCT/JP2019/033601 filed on Aug. 28, 2019, claiming the benefit of priority of Japanese Patent Application Number 2018-174276 filed on Sep. 18, 2018, the entire contents of which are hereby incorporated by reference.

BACKGROUND

1. Technical Field

The present disclosure relates to depth acquisition devices and the like which acquire a depth of image.

2. Description of the Related Art

Conventionally, a distance measurer for measuring a distance to a subject of image has been proposed (for example, refer to Japanese Unexamined Patent Application Publication No. 2011-64498 (PTL 1)). This distance measurer includes a light source and an imager. The light source irradiates the subject with light. The imager images the light reflected on the subject. Then, the distance measurer converts each pixel value in the image generated by the imaging into a distance to the subject, thereby measuring the distance to the subject. In other words, the distance measurer acquires a depth of the image generated by the imager.

SUMMARY

However, the distance measurer in PTL 1 has a problem of failing to accurately acquire the depth.

Therefore, the present disclosure provides a depth acquisition device capable of accurately acquiring a depth of an image.

In accordance with an aspect of the present disclosure, a depth acquisition device includes: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; detecting a dust region showing dust from the infrared light image; and estimating a depth of the dust region based on the infrared light image, the visible light image, and the dust region.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

The depth acquisition device according to the present disclosure is capable of accurately acquiring a depth of an image. Additional advantages and effects of the aspect of the present disclosure will be apparent from the Description and the Drawings. The advantages and/or effects may be individually obtained by the various embodiments and the features of the Description and the Drawings, which need to all be provided in order to obtain one or more such advantages and/or effects.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a schematic diagram illustrating a pixel array in a solid-state imaging element according to Embodiment;

Figure 1:
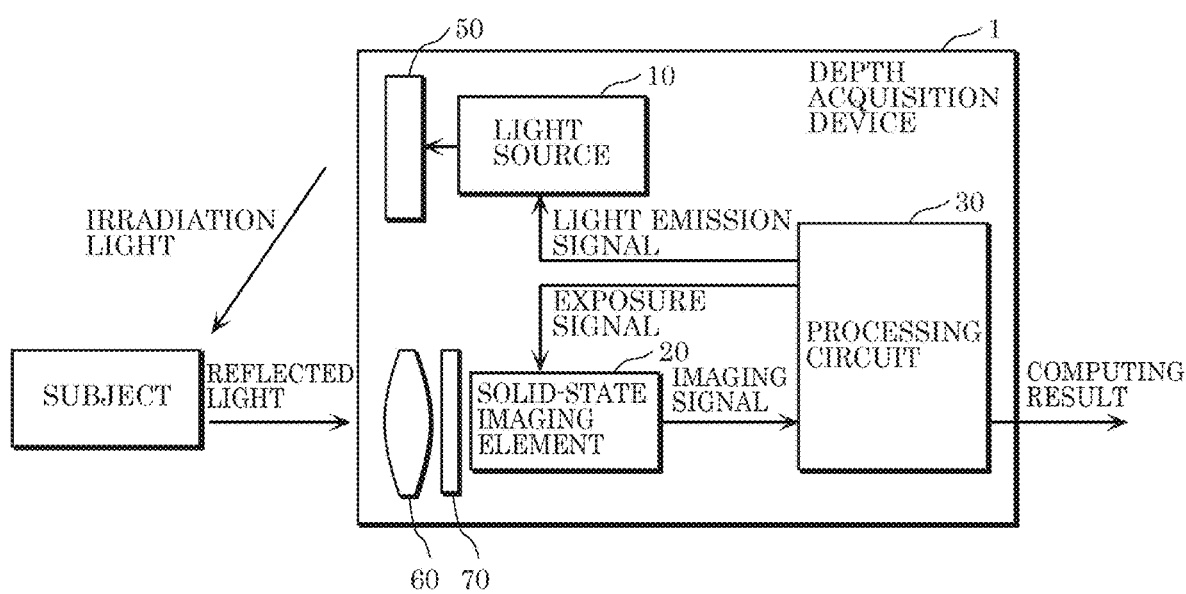
FIG. 1 is a block diagram illustrating a hardware structure of a depth acquisition device according to Embodiment.

DETAILED DESCRIPTION OF THE EMBODIMENT (Findings on Which the Present Disclosure is Based)

The present inventors have found that the following problems occur in connection to the distance measurer of PTL 1 described in the "BACKGROUND ART" section.

The distance measurer of PTL 1, as described above, acquires an image by irradiating light from a light source to a subject and imaging the subject irradiated with light, and measures depth of the image. In the measurement of depth, Time Of Flight (TOF) is used. In such a distance measurer, imaging at mutually different imaging conditions is performed to improve distance measurement accuracy. That is, the distance measurer performs imaging according to a predetermined imaging condition, and depending on that imaging result, sets an imaging condition different from the predetermined imaging condition. Then, the distance measurer performs imaging again according to the set imaging condition.

However, in an image obtained by the imaging, dust which is present near the distance measurer may be reflected as noise. Consequently, it is not possible to remove noise which is the dust only from the image on which the dust is projected, and it is not possible to measure depth correctly. Even if the imaging conditions are changed, it may be difficult to easily suppress the reflection of dust. Further, for example, if a distance measurer mounted on a vehicle repeats imaging under different imaging conditions while the vehicle is traveling, since the viewpoint position of the repeated imaging will differ, each scene of a plurality of images to be obtained will be different. That is, it is not possible to repeat imaging for the same scene, and thus it is not possible to appropriately estimate the depth of the image on which the scene is projected, particularly the depth of the region on which dust is projected.

In order to solve the above problem, in accordance with an aspect of the present disclosure, a depth acquisition device includes: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; detecting a dust region showing dust from the infrared light image; and estimating a depth of the dust region based on the infrared light image, the visible light image, and the dust region.

Since this allows the dust region to be detected from the infrared light image and, in that dust region, depth is estimated based on not only the infrared light image but also the visible light image, it is possible to appropriately acquire the depth of the dust region. That is, the scene to be imaged is substantially the same between the infrared light image and the visible light image, and the viewpoint and the imaging time are also substantially the same. Here, one example of images of substantially the same scene, which are imaged at substantially same viewpoint and imaging time, are images which are imaged by different pixels of the same imaging element. These images are similar to each channel image of red, green, and blue of a color image, which is imaged with a color filter of Bayer array, in which the viewing angle, the viewpoint point, and the imaging time of each image are substantially equal. That is, images of a substantially same scene, which are imaged at substantially same viewpoint and the imaging time, will not differ in the position on the image of a subject by not less than two pixels in each of imaged images. For example, when a point light source having visual light and infrared components is present in a scene, and only one pixel is imaged to have higher luminance in the visible light image, the point light source is imaged in the infrared light image as well within the distance closer than two pixels from the pixel corresponding to the position of the pixel imaged in the visible light image. Moreover, the substantially same imaging time indicates that the imaging time is equal within a difference of one frame or less. Therefore, the infrared light image and the visible light image have high correlation with each other. However, when there is dust near the camera that performs imaging of an infrared light image and a visible light image, irradiated infrared light is strongly reflected on the dust, and the dust may be reflected in the infrared light image due to the strong reflected light. Therefore, it is likely that even if dust is reflected in the infrared light image, dust will not be reflected in the visible light image. Therefore, information lacking in the dust region can be supplemented from a region in the visible light image corresponding to the dust region (that is, a corresponding region). Consequently, it is possible to eliminate the effect of noise, which is dust, thereby appropriately acquiring the depth of the dust region.

For example, it is possible that in the estimating of the depth of the dust region, the processor performs: estimating first depth information indicating a depth at each position in the infrared light image; estimating second depth information indicating a corrected depth at each position in the dust region, the corrected depth being obtained by correcting, based on the visible light image, a depth at each position in the dust region which is indicated in the first depth information; and generating third depth information indicating (i) a depth at each position in a region other than the dust region in the infrared light image which is indicated in the first depth information and (ii) a depth at each position in the dust region in the infrared light image which is indicated in the second depth information. It is noted that in the estimating of the first depth information, TOF, etc. may be applied to the infrared light image.

As a result of this, the third depth information indicates a depth obtained from the infrared light image as the depth of a region other than the dust region in the infrared light image, and a depth obtained from the infrared light image and corrected based on the visible light image as the depth of the dust region of the infrared light image. Therefore, even in a case where there is a dust region in an infrared light image, it is possible to appropriately estimate the depth of the entire infrared light image.

It is also possible that in the detecting of the dust region, the processor performs detecting, as the dust region, a higher luminance region having a luminance not less than a first threshold in the infrared light image, when the higher luminance region satisfies a first condition.

The luminance tends to be higher within a dust region. Therefore, it is possible to narrow down a potential region on which dust is likely to be projected, by detecting a higher luminance region having a luminance not less than a first threshold in the infrared light image. Further, since the higher luminance region satisfying the first condition is detected as the dust region, it is possible to detect the dust region with higher accuracy by appropriately setting the first condition.

It is further possible that the first condition is that a center of gravity of the higher luminance region is located on a straight or an arc, the straight line or the arc intersecting (i) a center of gravity of each of at least two higher luminance regions other than the higher luminance region in the infrared light image and (ii) a Focus of Expansion (FOE) of one of the infrared light image and the visible light image.

For example, when imaging one dust, if the camera performs multiple exposures for the imaging of one frame of infrared light image, the dust is projected on the infrared light image as a higher luminance region every time that exposure is performed. Accordingly, when the above-described camera is mounted on a moving body such as a vehicle and is moving, it is highly likely that the dust is projected on the infrared light image as if it were blown out from an FOE. For example, if the moving speed of the above-described moving body is high, these multiple higher luminance regions attributable to dust tend to be arranged on a straight line that intersects the FOE. Alternatively, if the distortion of the lens of the camera is large, multiple higher luminance regions attributable to dust tends to be arranged on an arc that intersects the FOE. Therefore, by setting the first condition that the centers of gravity of at least three higher luminance regions are arranged on the above-described straight line or arc, it is made possible to detect a dust region with high accuracy.

It is noted that since the scene to be imaged is substantially the same and the viewpoint is also substantially the same between in the infrared light image and in the visible light image, the FOE of the infrared light image and the FOE of the visible light image are substantially the same.

It is still further possible that the first condition is that one of a principle axis of the higher luminance region and a line extending from the principle axis intersects a Focus of Expansion (FOE) of one of the infrared light image and the visible light image.

For example, contrary to the above-described example, if the moving speed of the moving body on which the camera is mounted is low, the above-described plurality of higher luminance regions overlap with each other. Consequently, these higher luminance regions are projected on the infrared light image as one higher luminance region having an elongated shape, in other words, a tailed shape. The principal axis or extension of the principal axis of such a higher luminance region attributable to dust tends to intersect an FOE. Therefore, by setting the first condition that the principal axis or extension of the principal axis of such higher luminance region intersect the FOE, it is made possible to detect the dust region with higher accuracy.

It is still further possible that in the detecting of the dust region, the processor performs detecting the higher luminance region as the dust region, when the higher luminance region further satisfies a second condition.

For example, a property that even if a dust region is observed in an infrared light image, it is not observed in a visible light image may be used as the second condition. Consequently, it is possible to detect a dust region with higher accuracy.

It is still further possible that the second condition is that a luminance of a position in the visible light image is less than a second threshold, the position in the visible light image corresponding to a center of gravity of the higher luminance region in the infrared light image.

Since a dust region is not observed in the BW image, the luminance of the position in a visible light image corresponding to the center of gravity of the dust region tends to be lower. Therefore, by setting the second condition that the luminance of the position in the visible light image corresponding to the center of gravity of the higher luminance region in the infrared light image is less than a second threshold, it becomes possible to detect the dust region with higher accuracy.

It is still further possible that the second condition is that a correlation coefficient between (i) a luminance in the higher luminance region in the infrared light image and (ii) a luminance in a region in the visible light image is less than a third threshold, the region in the visible light image corresponding to the higher luminance region.

Since there is a property that even if a dust region is observed in the infrared light image, it is not observed in the visible light image, correlation between the luminance in a dust region of the infrared light image and the luminance in the region of the visible light image corresponding to the dust region tends to become lower. Therefore, by setting the second condition that the correlation coefficient between the luminance in a higher luminance region of the infrared light image and the luminance in the region of the visible light image corresponding to the higher luminance region is less than a third threshold, it is possible to detect the dust region with higher accuracy.

It is still further possible that in the estimating of the depth of the dust region, the processor performs: estimating depth information indicating a depth at each position in the infrared light image; and correcting a depth at each position in the dust region which is indicated in the depth information, by inputting the infrared light image, the visible light image, the dust region, and the depth information into a learning model.

If a learning model is trained in advance to output a correct depth at each position in the dust region upon input of an infrared light image, a visible light image, a dust region, and depth information, it is possible to appropriately correct the depth information estimated from the infrared light image. That is, it is possible to appropriately correct the depth at each position in the dust region indicated by the depth information.

In accordance with another aspect of the present disclosure, a depth acquisition device includes: a memory; and a processor, wherein the processor performs: acquiring timing information indicating a timing at which a light source irradiates a subject with infrared light; acquiring an infrared light image stored in the memory, the infrared light image being generated by imaging a scene including the subject with the infrared light according to the timing indicated by the timing information; acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image; estimating depth information indicating a depth at each position in the infrared light image; and correcting a depth at each position in a dust region showing dust in the infrared light image by inputting the infrared light image, the visible light image, and the depth information into a learning model, the depth at each position in the dust region being indicated in the depth information.

If a learning model is trained in advance to output a correct depth at each position in the dust region of the infrared light image upon input of the infrared light image, the visible light image, and the depth information, it is possible to appropriately correct the depth information estimated from the infrared light image. That is, it is possible to appropriately correct the depth at each position in the dust region indicated by the depth information without detecting the dust region.

In accordance with still another aspect of the present disclosure, a depth acquisition device includes: a memory; and a processor, wherein the processor performs: acquiring an infrared light image stored in the memory, the infrared light image being generated by imaging with infrared light; acquiring a visible light image stored in the memory, the visible light image being generated by imaging with visible light from a substantially same viewpoint as a viewpoint of the imaging the infrared light image at a substantially same time as an imaging time of imaging the infrared light image; detecting, as a dust region, a region showing dust from the infrared light image; and estimating a depth of the dust region based on the visible light image.

This makes it possible to eliminate the effect of noise which is dust, and appropriately acquire a depth of the dust region as in the depth acquisition device according to the above-described one aspect of the present disclosure.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

Hereinafter, an embodiment will be described in detail with reference to the accompanying Drawings.

It should be noted that the following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure.

It should also be noted that the respective figures are schematic diagrams and are not necessarily precise illustrations. Additionally, components that are essentially the same share like reference signs in the figures.

Embodiment

[Hardware Configuration]

FIG. 1 is a block diagram illustrating a hardware configuration of depth acquisition device 1 according to Embodiment. Depth acquisition device 1 according to the present embodiment has a hardware configuration which is capable of acquiring an image based on infrared light (or near infrared light) and an image based on visible light by imaging of a substantially same scene, the imaging being performed at a substantially same viewpoint and imaging time. It should be noted that substantially same means "the same to the extent that the effects in the present disclosure can be achieved."

As shown in FIG. 1, depth acquisition device 1 is configured to include light source 10, solid-state imaging element 20, processing circuit 30, diffusion plate 50, lens 60, and band-pass filter 70.

Light source 10 irradiates irradiation light. More specifically, light source 10 emits irradiation light to be irradiated to a subject at a timing indicated by a light emission signal generated in processing circuit 30.

Light source 10 is configured to include, for example, a capacitor, a driving circuit, and a light emitting element, and emits light by driving the light emitting element with electric energy accumulated in the capacitor. The light emitting element is implemented by, as an example, a laser diode, a light emitting diode, and the like. It should be noted that light source 10 may be configured to include one kind of light emitting element, or configured to include plural kinds of light emitting elements according to purposes.

Hereinafter, the light emitting element is, for example, a laser diode that emits near infrared light, or a light emitting diode that emits near infrared light, or the like. However, the irradiation light irradiated by light source 10 may be infrared light (also referred to as infrared ray) of a frequency band other than near infrared light. Hereinafter, in the present embodiment, although the irradiation light irradiated by light source 10 will be described as infrared light, the infrared light may be near infrared light, or infrared light of a frequency band other than that of near infrared light.

Solid-state imaging element 20 images a subject and outputs an imaging signal indicating an exposure amount. To be more specifically, solid-state imaging element 20 performs exposure at a timing indicated by an exposure signal generated in processing circuit 30, and outputs an imaging signal indicating an exposure amount.

Solid-state imaging element 20 has a pixel array in which a first pixel that performs imaging with reflected light, which is irradiation light reflected by a subject, and a second pixel that images the subject are disposed in an array. Solid-state imaging element 20 may have, for example, as needed, cover glass, and a logic function such as an A/D converter, etc.

Hereinafter, as with the irradiation light, description will be made supposing that the reflected light is infrared light. However, the reflected light does not need to be limited to infrared light provided that the light is irradiation light reflected by a subject.

Figure 2:
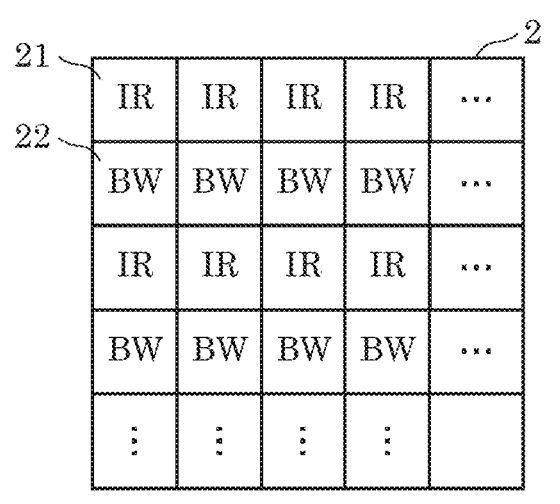

FIG. 2 is a schematic diagram illustrating pixel array 2 included in solid-state imaging element 20.

As shown in FIG. 2, pixel array 2 is configured to be disposed in an array pattern such that first pixel 21 (IR pixel) that performs imaging with reflected light, which is irradiation light reflected by a subject, and second pixel 22 (BW pixel) that images the subject are alternately aligned in columns.

Moreover, in FIG. 2, although second pixel 22 and first pixel 21 are arranged to be adjacent to each other in the row direction and are disposed to be aligned in a stripe pattern in the row direction, in pixel array 2, this is not limiting and they may be disposed every multiple rows (every two rows, for example). That is, the first row in which second pixels 22 are arranged to be adjacent to each other in the row direction, and the second row in which first pixels 21 are arranged to be adjacent to each other in the row direction may be disposed alternately every M rows (M is a natural number). Further, the first row, in which second pixels 22 are arranged to be adjacent to each other in the row direction, and the second row, in which first pixels 21 are arranged to be adjacent to each other in the row direction, may be disposed every different number of rows (N rows of the first row and L rows of the second row are alternately repeated (N and L are different natural numbers)).

First pixel 21 is implemented by, for example, an infrared light pixel sensitive to infrared light which is the reflected light. Second pixel 22 is implemented by, for example, a visible light pixel sensitive to visible light.

The infrared light pixel is configured to include, for example, an optical filter (also called as an IR filter) which transmits only infrared light, a micro lens, a light receiving element as a photoelectric converter, and an accumulator that accumulates electric charge generated at the light receiving element. Therefore, an image indicating the luminance of infrared light is represented by an imaging signal outputted from a plurality of infrared light pixels (that is, first pixel 21) included in pixel array 2. Hereinafter, this image of infrared light is also referred to as IR image or infrared image.

Moreover, the visible light element is configured to include, for example, an optical filter (also called as a BW filter) which transmits only visible light, a micro lens, a light receiving element as a photoelectric converter, and an accumulator that accumulates electric charge converted at the light receiving element. Therefore, the visible light pixel, that is, second pixel 22, outputs an imaging signal indicating luminance and color difference. That is, a color image that indicates luminance and color difference of visible light is represented by an imaging signal outputted from a plurality of second pixels 22 included in pixel array 2. It should be noted that the optical filter of visible light pixel may transmit both visible light and infrared light, or may transmit only light of a specific wavelength such as red (R), green (G), or blue (B) of visible light.

Moreover, the visible light pixel may detect only the luminance of visible light. In this case, the visible light pixel, that is, second pixel 22, outputs an imaging signal indicating luminance. Therefore, a pixel of black and white that indicates the luminance of visible light, in other words, a monochrome image is represented by an imaging signal outputted from a plurality of second pixels 22 included in pixel array 2. This monochrome image is hereinafter referred to as a BW image. It should be noted that the above-described color image and the BW image are collectively referred to as a visible light image.

Referring back to FIG. 1 again, description of depth acquisition device 1 will be continued.

Processing circuit 30 computes subject information relating to a subject by using the imaging signal outputted by solid-state imaging element 20.

Processing circuit 30 is constituted by, for example, an arithmetic processing unit such as a microcomputer. The microcomputer includes a processor (microprocessor), a memory, etc. and generates a light emitting signal and an exposure signal by the processor executing a driving program stored in the memory. It should be noted that processing circuit 30 may use PGA or ISP, etc. and may be constituted by one hardware or multiple hardware.

Processing circuit 30 calculates distance to a subject by, for example, a TOF distance measurement method which is performed by using the imaging signal from first pixel 21 of solid-state imaging element 20.

Hereinafter, referring to the drawings, calculation of distance to a subject by the TOF distance measurement method performed by processing circuit 30 will be described.

Figure 3:
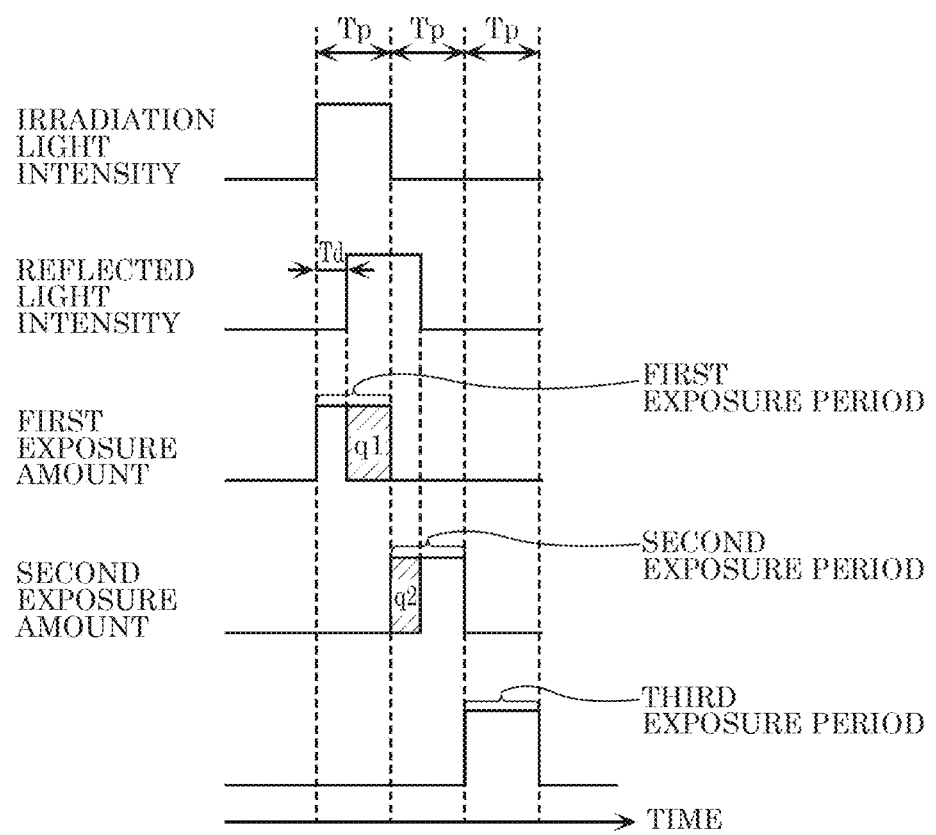
FIG. 3 is a time chart illustrating a light emitting timing of a light emitting element of a light source and exposure timings of a first pixel in the solid-stage imaging element according to Embodiment.

FIG. 3 is a time chart illustrating a relationship between the light emitting timing of the light emitting element of light source 10 and the exposure timing of first pixel 21 of solid-state imaging element 20 when processing circuit 30 calculates a distance to a subject by using the TOF distance measurement method.

In FIG. 3, Tp is a light emission period during which a light emitting element of light source 10 emits irradiation light, and Td is a delay time from when the light emitting element of light source 10 emits the irradiation light until when reflected light which is the irradiation light reflected by a subject returns to solid-state imaging element 20. And the first exposure period is at the same timing at that of the light emission period during which light source 10 emits irradiation light, and the second exposure period is timing from the end time point of the first exposure period until an elapse of the light emission period Tp.

In FIG. 3, q1 indicates a total amount of exposure amount in first pixel 21 of solid-state imaging element 20 by the reflected light in the first exposure period, and q2 indicates a total amount of exposure amount in first pixel 21 of solid-state imaging element 20 by the reflected light in the second exposure period.

By performing light emission of irradiation light by the light emitting element of light source 10 and exposure by first pixel 21 of solid-state imaging element 20 at a timing shown in FIG. 3, it is possible to represent a distance d to a subject by the following (Equation 1) with c as the speed of light.

$$d = c \times Tp/2 \times q2/(q1+q2) \qquad \text{(Equation 1)}$$

Therefore, processing circuit 30 can calculate the distance to a subject by using an imaging signal from first pixel 21 of solid-state imaging element 20 by using (Equation 1).

Further, a plurality of first pixels 21 of solid-state imaging element 20 may be exposed for a third exposure period Tp after the end of the first exposure period and the second exposure period. The plurality of first pixels 21 can detect noises other than reflected light by the exposure amount obtained in the third exposure period Tp. That is, processing circuit 30 can more accurately calculate the distance d to a subject by deleting noises respectively from exposure amount q1 in the first exposure period and exposure amount q2 in the second exposure period, in the above-described (Equation 1).

Referring back to FIG. 1 again, description of depth acquisition device 1 will be continued.

Processing circuit 30 may perform detection of a subject, and calculation of the distance to the subject by using imaging signals from, for example, second pixel 22 of solid-state imaging element 20.

That is, processing circuit 30 may perform detection of a subject and calculation of a distance to the subject based on visible light image imaged by a plurality of second pixels 22 of solid-state imaging element 20. Here, the detection of a subject may be implemented by, for example, performing discrimination of shape by pattern recognition through edge detection of a singular point of the subject, or may be implemented by processing such as Deep Learning by using a learning model trained in advance. Further, calculation of a distance to the subject may be performed by using global coordinate transformation. As a matter of course, detection of a subject may be implemented by multi-modal learning process by using not only visible light image, but also luminance and distance information of infrared light imaged by first pixel 21.

Processing circuit 30 generates a light emission signal indicating the timing of light emission, and an exposure signal indicating the timing of exposure. Then, processing circuit 30 outputs the generated light emission signal to light source 10, and outputs the generated exposure signal to solid-state imaging element 20.

Processing circuit 30 may make depth acquisition device 1 implement continuous imaging at a predetermined frame rate, for example, by generating and outputting a light emission signal so as to make light source 10 emit light on a predetermined cycle, and generating and outputting an exposure signal so as to expose solid-state imaging element 20 on a predetermined cycle. Moreover, processing circuit 30 includes, for example, a processor (microprocessor), a memory, and the like, and a light emission signal and an exposure signal are generated by the processor executing driving program stored in the memory.

Diffusion plate 50 adjusts the intensity distribution and the angle of irradiation light. Moreover, in the adjustment of the intensity distribution, diffusion plate 50 makes the intensity distribution of irradiation light from light source 10 uniform. It should be noted that in the example shown in FIG. 1, depth acquisition device 1 includes diffusion plate 50; however, this diffusion plate 50 may not be included.

Lens 60 is an optical lens that collects light entering from the outside of depth acquisition device 1 on the surface of pixel array 2 of solid-state imaging element 20.

Band-pass filter 70 is an optical filter that transmits infrared light which is reflected light and visible light. It should be noted that in an example shown in FIG. 1, depth acquisition device 1 includes band-pass filter 70; however, this band-pass filter 70 may not be included.

Depth acquisition device 1 of the above-described configuration is used by being installed on a transport equipment. For example, depth acquisition device 1 is used by being installed on a vehicle that travels on the road surface. It should be noted that the transport equipment on which depth acquisition device 1 is installed does not need to be limited to a vehicle. Depth acquisition device 1 may be used by being installed on a transport equipment other than vehicles, such as motorcycles, boats, air planes, and the like.

[Outline of Depth Acquisition Device]

Depth acquisition device 1 in the present embodiment acquires an IR image and a BW image with hardware configuration shown in FIG. 1 by imaging of a substantially same scene, the imaging being performed at a substantially same viewpoint and a same time. And depth acquisition device 1 corrects the depth at each position in the IR image obtained from that IR image by using the BW image. Specifically, when a region showing dust (hereinafter, referred to as a dust region) exists in an IR image, depth acquisition device 1 corrects the depth at each position in the dust region obtained from that IR image by using the image in the region of the BW image corresponding to the dust region. It is therefore possible to appropriately acquire a depth of the dust region by excluding influence of noise that is the dust.

Figure 4:
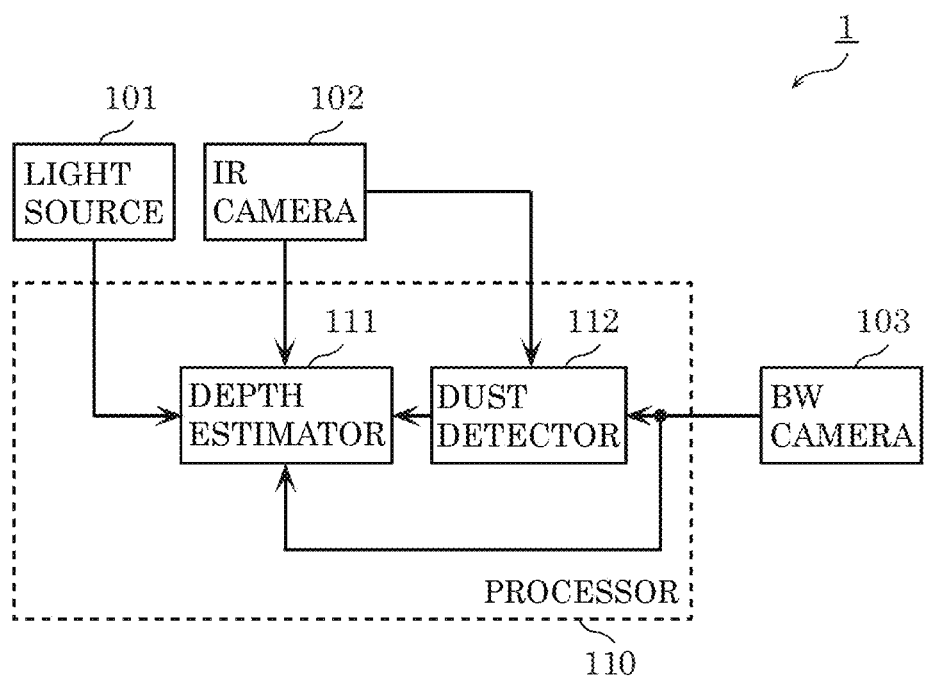
FIG. 4 is a block diagram illustrating an example of a functional structure of the depth acquisition device according to Embodiment.

FIG. 4 is a block diagram illustrating an example of a functional structure of depth acquisition device 1.

Depth acquisition device 1 includes light source 101, IR camera 102, BW camera 103, depth estimator 111, and dust detector 112.

Light source 101 may be constituted by light source 10 and diffusion plate 50 shown in FIG. 1.

IR camera 102 may be constituted by a plurality of first pixels 21 of solid-state imaging element 20, lens 60, and band-pass filter 70 shown in FIG. 1. Such IR camera 102 acquires an IR image by performing imaging of a scene including the subject with infrared light according to timing at which light source 101 irradiates infrared light to the subject.

BW camera 103 may be constituted by a plurality of second pixels 22 of solid-state imaging element 20, lens 60, and band-pass filter 70 shown in FIG. 1. Such BW camera 103 acquires a visible light image (specifically, a BW image) by imaging of a substantially same scene as that of the infrared image, the imaging being performed with visible light at a substantially same viewpoint and imaging time as those of the infrared image.

Depth estimator 111 and dust detector 112 may be implemented as a function of processing circuit 30 shown in FIG. 1, specifically as a function of processor 110.

Dust detector 112 detects a dust region from an IR image based on an IR image obtained by imaging by IR camera 102, and a BW image obtained by imaging by BW camera 103. In the other words, dust detector 112 divides the IR image obtained by the imaging into dust regions showing dust and non-dust regions not showing dust.

When there are fine particles such as dust in the vicinity of IR camera 102, the IR image shows the dust as large noise. The dust region according to the present embodiment is a region having a higher luminance and showing dust. For example, when there is dust near depth acquisition device 1, infrared light which has been irradiated from light source 101 to dust and reflected on the dust is received by solid-state imaging element 20 while keeping a higher luminance. Therefore, in the IR image, a region showing dust, in other words, each pixel in the dust region has a higher luminance.

Depth estimator 111 estimates a depth at each position in the IR image including a dust region detected by dust detector 112. Specifically, depth estimator 111 acquires an IR image obtained by imaging by IR camera 102 according to irradiation timing of infrared light to a subject by light source 101, and based on the IR image, depth at each position in the IR image is estimated. Further, depth estimator 111 corrects the depth at each position estimated in the dust region detected by dust detector 112, based on the BW image. That is, depth estimator 111 estimates a depth of the dust region based on the IR image, the BW image, and the dust region.

Figure 5:
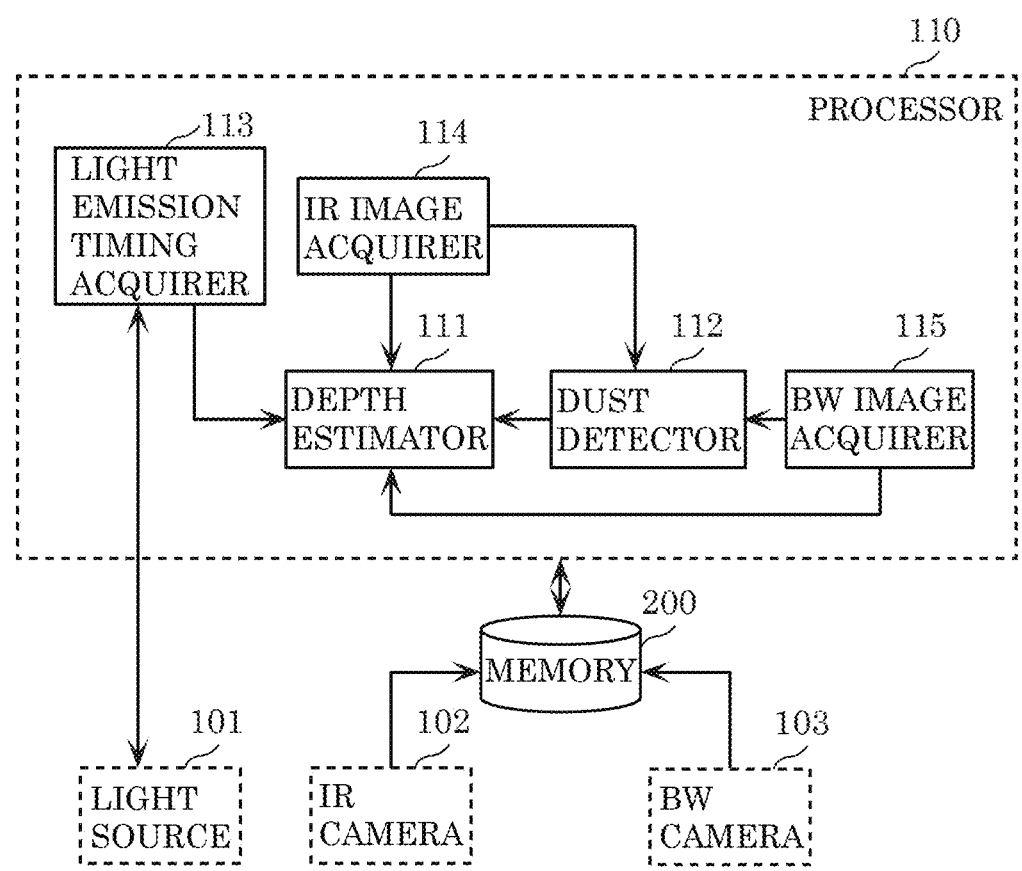
FIG. 5 is a block diagram illustrating another example of a functional structure of the depth acquisition device according to Embodiment.

FIG. 5 is a block diagram illustrating another example of a functional structure of depth acquisition device 1.

Depth acquisition device 1 may include memory 200 and processor 110.

Moreover, processor 110 may not only include depth estimator 111 and dust detector 112, may but also include light emission timing acquirer 113, IR image acquirer 114, and BW image acquirer 115. It should be noted that these components are implemented respectively as a function of processor 110.

Light emission timing acquirer 113 acquires timing information indicating a timing at which light source 101 irradiates infrared light to a subject. That is, light emission timing acquirer 113 outputs the light emission signal shown in FIG. 1 to light source 101, and thereby acquires information indicating the timing of the output as the above-described timing information.

IR image acquirer 114 acquires an IR image which is retained in memory 200, the IR image being obtained by imaging of a scene including a subject with infrared light according to the timing indicated by the timing information.

BW image acquirer 115 acquires a BW image retained in memory 200, in which the BW image is obtained by imaging of a substantially same scene as that of the above-described IR image with visible light, the imaging being performed at a substantially same viewpoint and imaging time as those of the IR image.

Dust detector 112 detects, as described above, a dust region from an IR image, and depth estimator 111 estimates a depth based on the IR image, the BW image, and the dust region.

It should be noted that depth acquisition device 1 in the present Embodiment may be constituted by processor 110 and memory 200 without including light source 101, IR camera 102, and BW camera 103.

Figure 6:
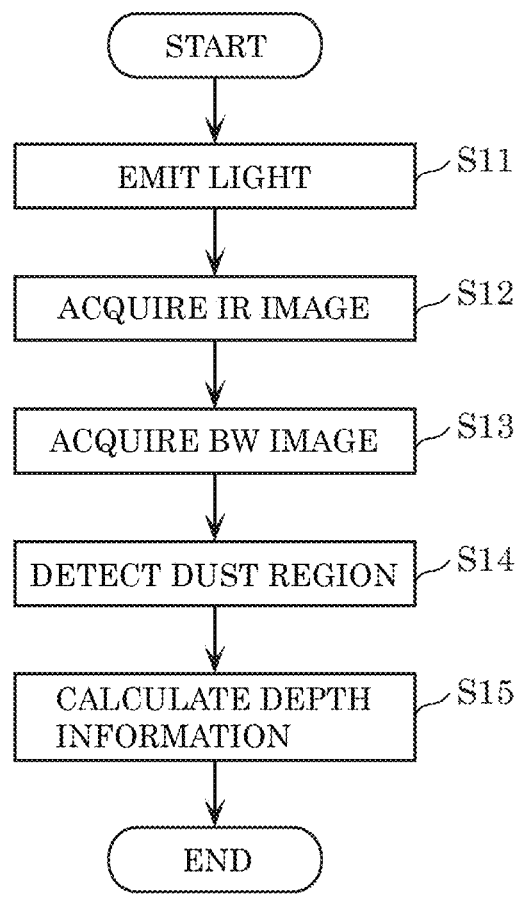
FIG. 6 is a flowchart illustrating overall processing operation of the depth acquisition device according to Embodiment.

FIG. 6 is a flowchart illustrating overall processing operation of depth acquisition device 1.

(Step S11)

First, light source 101 emits light, and thereby irradiates infrared light to a subject.

(Step S12)

Next, IR camera 102 acquires an IR image. That is, IR camera 102 images a scene including a subject which is irradiated with infrared light by light source 101. In this way, IR camera 102 acquires an IR image based on infrared light reflected from the subject. Specifically, IR camera 102 acquires IR images obtained at respective timings and by exposure amounts of the first exposure period, the second exposure period, and the third exposure period shown in FIG. 3.

(Step S13)

Next, BW camera 103 acquires a BW image. That is, BW camera 103 acquires a BW image corresponding to the IR image acquired in step S12, that is, a BW image of the same scene, the same viewpoint, and the same imaging time as those of the IR image.

(Step S14)

Then, dust detector 112 detects a dust region from the IR image acquired in step S12.

(Step S15)

Next, depth estimator 111 estimates a depth of the dust region based on the IR image acquired in step S12, the BW image acquired in step S13, and the dust region detected in step S14.

Figure 7:
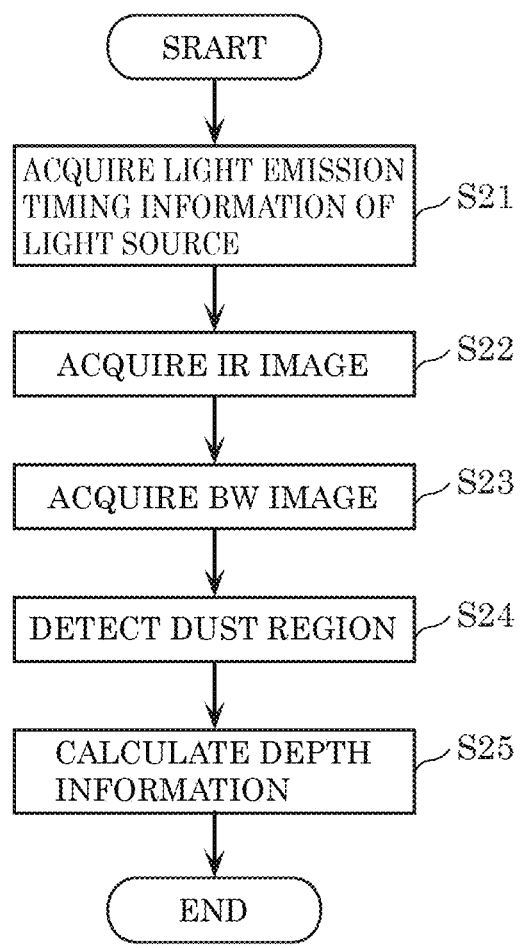
FIG. 7 is a flowchart illustrating overall processing operation by a processor of the depth acquisition device according to Embodiment.

FIG. 7 is a flowchart illustrating overall processing operation by processor 110 of depth acquisition device 1.

(Step S21)

First, light emission timing acquirer 113 of processor 110 acquires timing information indicating the timing at which light source 101 irradiates infrared light to a subject.

(Step S22)

Next, IR image acquirer 114 acquires an IR image from IR camera 102 that has performed imaging according to the timing indicated by the timing information acquired in step S21. For example, IR image acquirer 114 outputs an exposure signal to IR camera 102 at the timing at which the light emission signal shown in FIG. 1 is outputted from light emission timing acquirer 113. In this way, IR image acquirer 114 causes IR camera 102 to start imaging, and acquires the IR image obtained by the imaging from IR camera 102. At this moment, IR image acquirer 114 may acquire an IR image from IR camera 102 via memory 200, or directly from IR camera 102.

(Step S23)

Next, BW image acquirer 115 acquires a BW image corresponding to the IR image acquired in step S22 from BW camera 103. At this moment, BW image acquirer 115 may acquire the BW image from BW camera 103 via memory 200, or directly from BW camera 103.

(Step S24)

Then, dust detector 112 detects a dust region from the IR image.

(Step S25)

Next, depth estimator 111 estimates a depth of a dust region based on the IR image acquired in step S22, the BW image acquired in step S23, and the dust region detected in step S24. As a result of this, depth information which at least indicates a depth of the dust region is calculated. It should be noted that at this moment, depth estimator 111 may estimate depth of not only the dust region but also the entire IR image, and calculate depth information indicating the estimation result.

Specifically, depth estimator 111 in the present embodiment estimates, from the IR image acquired in step S22, a depth at each position in the IR image. Then, depth estimator 111 corrects the depth at each position in the dust region by using the BW image. It should be noted that each position may be respective positions of a plurality of pixels, or a position of a block consisting of a plurality of pixels.

In such depth acquisition device 1 in the present embodiment, since a dust region is detected from an IR image, and in that dust region, depth is estimated based on not only the IR image but also the BW image, it is possible to appropriately acquire the depth of the dust region. That is, the scene to be imaged is substantially the same between the IR image and the BW image, and the viewpoint and the imaging time are also substantially the same. Therefore, the IR image and the BW image have high correlation. Moreover, dust and the like are a phenomenon which is dependent on wavelength, and even if dust and the like occur in an IR image, it is highly likely that dust does not occur in the BW image even if it occurs in the IR image. Therefore, it is possible to supplement information lacking in a dust region from a region (that is, corresponding region) in the BW image corresponding the dust region. Consequently, it is possible to appropriately acquire the depth of the dust region.

[Specific Functional Structure of Depth Acquisition Device]

Figure 8:
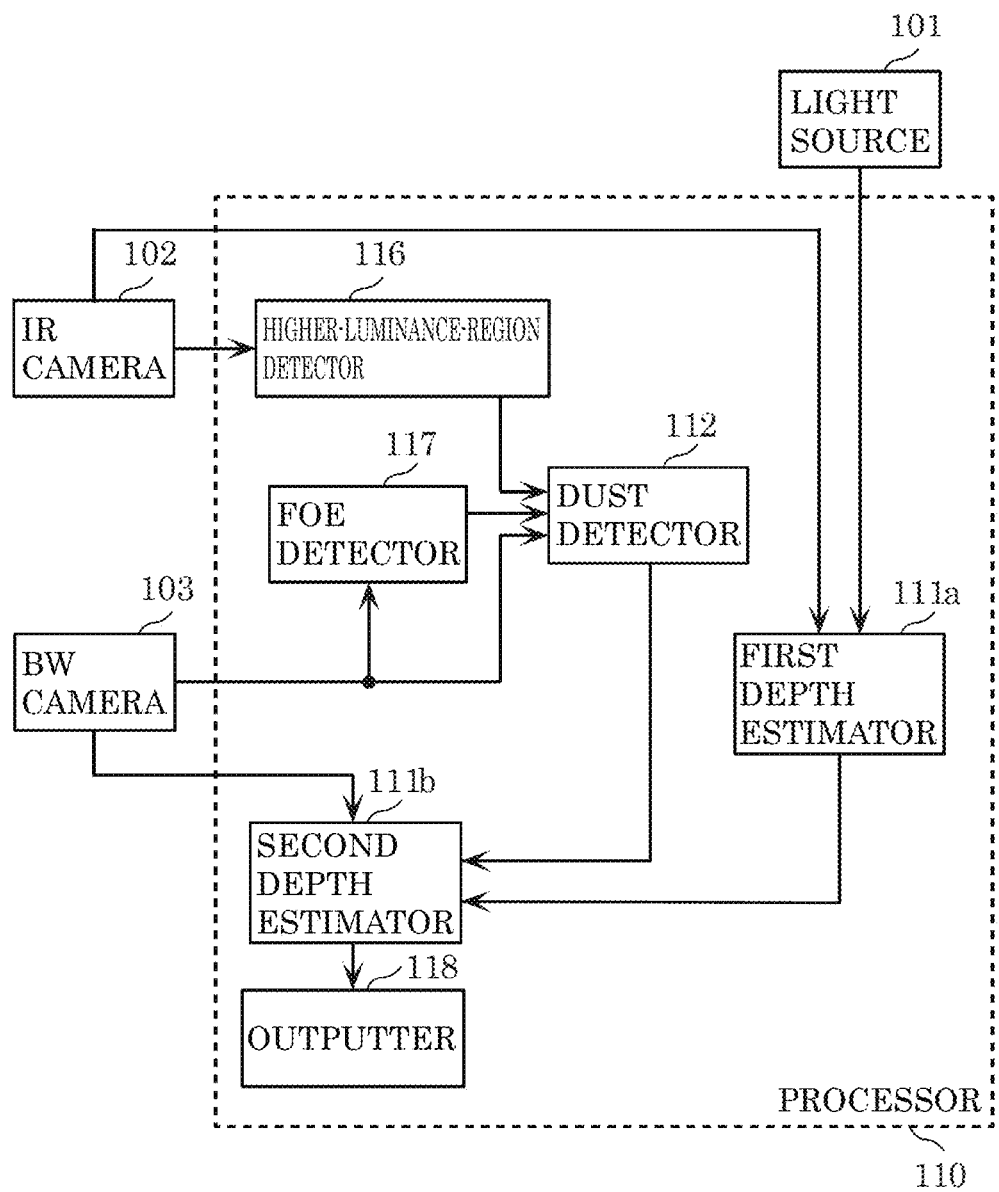
FIG. 8 is a block diagram illustrating a functional structure of the processor of the depth acquisition device according to Embodiment.

FIG. 8 is a block diagram illustrating a specific functional structure of processor 110 of depth acquisition device 1.

Processor 110 includes first depth estimator 111a, second depth estimator 111b, dust detector 112, higher-luminance-region detector 116, FOE detector 117, first edge detector 117IR, second edge detector 117BW, and outputter 118. It should be noted that first depth estimator 111a and second depth estimator 111b correspond to depth estimator 111 shown in FIG. 5. Moreover, processor 110 may include the above-described light emission timing acquirer 113, IR image acquirer 114, and BW image acquirer 115.

Higher-luminance-region detector 116 detects a region having a luminance not less than first threshold in an IR image, as a higher luminance region.

FOE detector 117 detects a focus of expansion (FOE) in the BW image. FOE is also referred to as a vanishing point. It is known that when IR camera 102 moves in parallel directions while the subject is still, an optical flow that is virtual movement on the image intersects one point. The one point is an FOE.

Dust detector 112 determines, for each of at least one higher luminance region in the IR image, whether or not the higher luminance region is a dust region. Here, the inventors have found that each dust shown in the IR image is seen long along a straight line or an arc which intersects an FOE of the higher luminance region, as if the dust is blown out from the FOE, or the dust is located along the straight line or the arc. When IR camera 120 is set in a movable body such as an automobile, movement of dust is smaller than movement of IR camera 120, which allows to assume that the dust is still. Therefore, IR image shows the dust that looks blown out from the FOE.

Furthermore, in depth acquisition device 1 according to the present embodiment, in terms of noise cancellation, each frame in the IR image and the BW image is obtained by imaging in which light exposure and light shielding are repeated a plurality of times. Therefore, by the exposure processes at different timings in a frame cycle, the same dust appears at a plurality of positions on one frame. Since the dust on the image is moving as if the dust is blown out from the FOE, dust regions at respective positions and the FOE are located on a straight line. Furthermore, when IR camera 120 imaging the same dust moves slowly, a plurality of dust regions resulted from a plurality of exposure processes in one frame cycle overlap in the IR image. As a result, one dust region having a shape that looks like leaving trace is formed. In this case, the FOE exists in the direction of leaving the trace as seen from the dust region. Dust detector 112 detects dust regions by using the above-described characteristics.

In other words, when a higher luminance region having a luminance not less than the first threshold in the IR image satisfies first conditions, dust detector 112 according to the present application detects the higher luminance region as a dust region. More specifically, the first conditions are that the center of gravity of the higher luminance region is located on a straight line or an arc which intersects (i) the center of gravity of each of at least two higher luminance regions that are different from the higher luminance region in the IR image and (ii) a focus of expansion (FOE) of the IR image or the BW image. It is also possible that the first conditions are that a principle axis or a line extending from the principle axis of the higher luminance region intersects the FOE of the IR image or the BW image. It should be noted that the principle axis is an axis of the trace when the higher luminance region has a shape of leaving the trace. It is therefore possible to detect dust regions at high accuracy.

Furthermore, dust detector 112 may detect a dust region by using also the characteristics that a dust region is not observed in the BW image as if the dust region is observed in the IR image. In other words, it is possible that when a higher luminance region further satisfies the second conditions, dust detector 112 detects the higher luminance region as a dust region. For example, the second conditions are that a luminance at a position in the BW image which corresponds to the center of gravity of the higher luminance region in the IR image is less than a second threshold. It is also possible that the second conditions are that a correlation coefficient between a luminance in the higher luminance region in the IR image and a luminance in a region in the BW image which corresponds to the higher luminance region in the IR image is less than a third threshold. It should be noted that a region in the BW image which corresponds to the higher luminance region in the IR image is located spatially at the same position as the position of the higher luminance region in the IR image, and has the same shape and size as those of the higher luminance region in the IR image. It is therefore possible to detect dust regions at high accuracy.

First depth estimator 111a and second depth estimator 111b have a function as the above-described depth estimator 111.

First depth estimator 111a estimates, based on an IR image acquired according to the timing of irradiation of infrared light by light source 101, a depth at each position in the IR image. First depth estimator 111a outputs the information indicating the estimated depth at each position in the IR image, as the first depth information. That is, first depth estimator 111a estimates first depth information which indicates the depth at each position in the IR image.

Second depth estimator 111b corrects the first depth information based on the BW image and the dust region in the IR image. As a result of this, in the depth at each position in the IR image indicated by the first depth information, the depth of the dust region is corrected. Second depth estimator 111b outputs information indicating a corrected depth at each position in the dust region as the second depth information. That is, second depth estimator 111b estimates the second depth information indicating corrected depth at each position in the dust region by correcting depth at each position in the dust region indicated by the first depth information based on the BW image.

Outputter 118 replaces a depth at each position in the dust region indicated by the first depth information with a corrected depth at each position in the dust region indicated by the second depth information. As a result of this, third depth information is generated, which includes a depth at each position in the region other than the dust region of the IR image indicated by the first depth information, and a corrected depth at each position in the dust region of the IR image indicated by the second depth information. Outputter 118 outputs the third depth information.

As a result of this, the third depth information indicates a depth obtained from an IR image as the depth outside the dust region of the IR image, and indicates a depth obtained from the IR image and corrected based on the BW image as the depth of the dust region of the IR image. Therefore, in the present embodiment, even when there is a dust region in the IR image, it is possible to appropriately estimate the depth of the entire IR image.

Figure 9A:
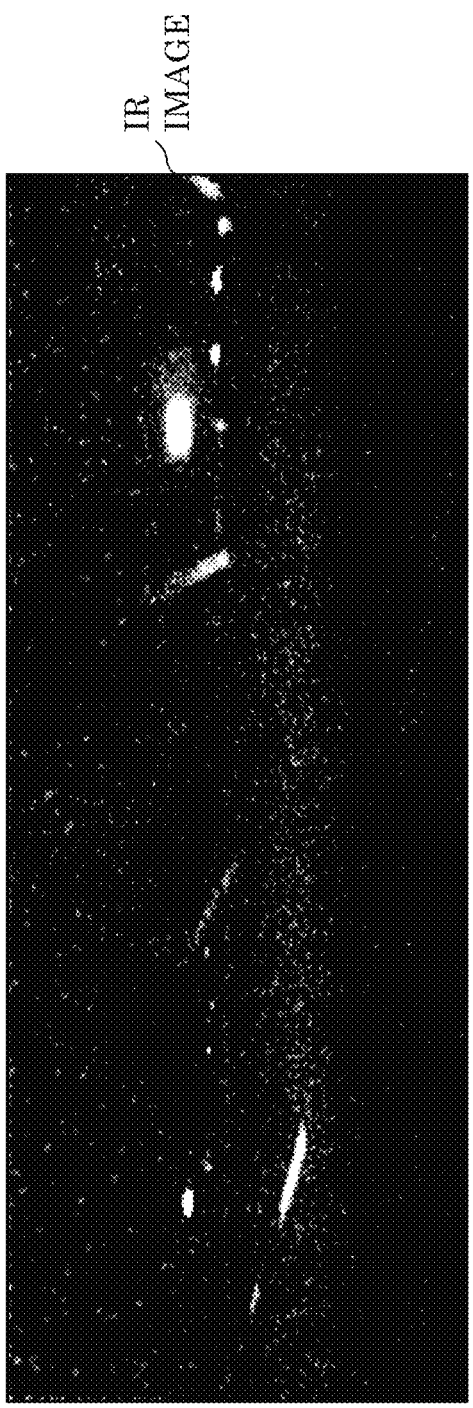
FIG. 9A is a diagram illustrating an example of an IR image.
Figure 9B:
FIG. 9B is a diagram illustrating an example of a BW image.

FIG. 9A shows an example of IR image. FIG. 9B shows an example of BW image.

As shown in FIG. 9B, in the BW image, for example, a scene in which the surroundings of the road on which a vehicle runs are moved away from BW camera 103 set in the vehicle is imaged by BW camera 103. On the road, for example, the running of the vehicle whirls up the dust. Accordingly, when IR camera 102 images the same scene as the scene shown in FIG. 9B from the same viewpoint and at the same time as those of BW camera 103, the IR image shown in FIG. 9A is acquired.

In the IR image acquired as described above, as shown in FIG. 9A, regions having a higher luminance have occurred. These regions include regions showing dust, namely, a dust region. For example, the dust regions are seen in a center part and a right part of the IR image. On the other hand, the BW image does not show such dust. This is because, in imaging of the IR image, the infrared light from light source 101 is irregularly reflected on the dust in the vicinity of IR camera 102 and BW camera 103, while in imaging of the BW image, the influence of the irregular reflection is smaller. Therefore, dust detector 112 detects dust regions by using characteristics that dust regions are observed in the IR image while no dust image is observed in the BW image.

Figure 10:
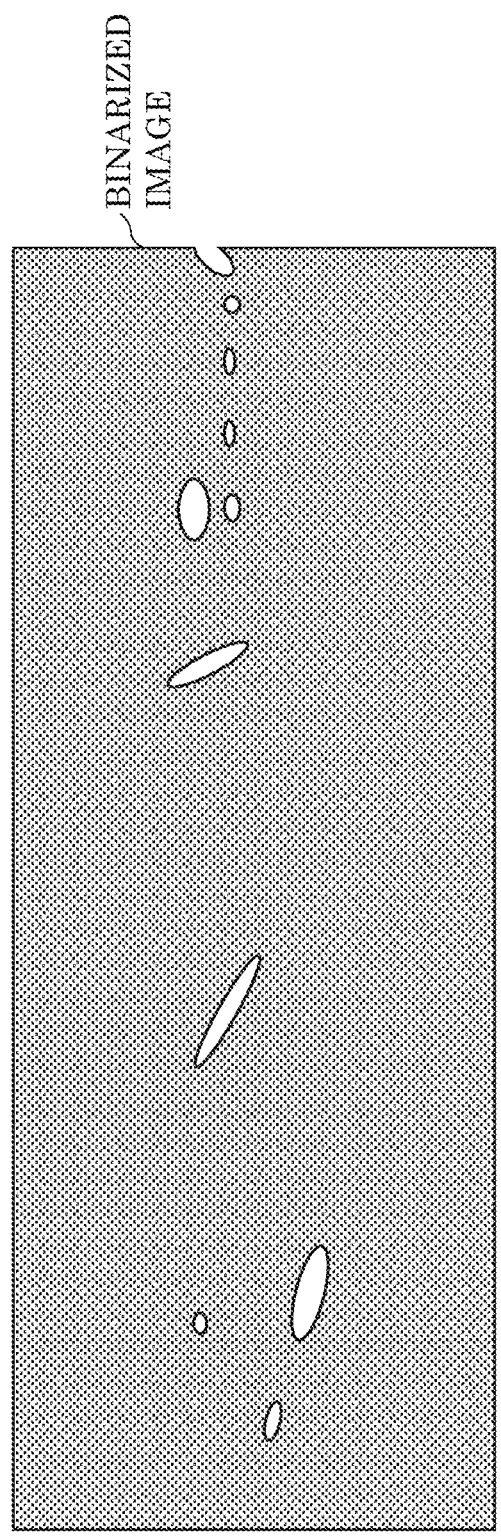
FIG. 10 is a diagram illustrating an example of a binarized image to be obtained by binarization of IR image.

FIG. 10 shows an example of binarized image obtained by binarization of an IR image.

Higher-luminance-region detector 116 detects, in the IR image shown in FIG. 9A, a region having a luminance of not less than a first threshold as a higher luminance region. That is, higher-luminance-region detector 116 binarizes the luminance at each position (that is, at each pixel) in the IR image. Consequently, for example, as shown in FIG. 10, a binarized image consisting of white regions and black regions (hatched region in FIG. 10) is generated.

Figure 11:
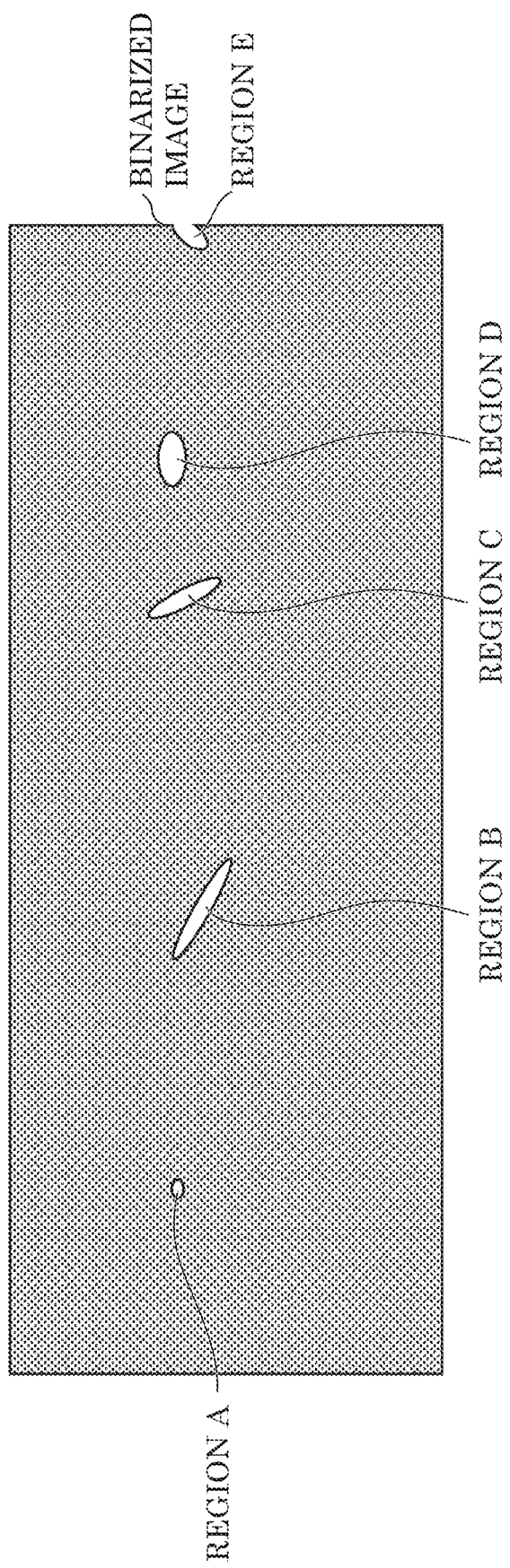
FIG. 11 is a diagram illustrating an example of a dust candidate region in an IR image.

FIG. 11 shows an example of a candidate of dust region in an IR image.

Dust detector 112 first detects the center of gravity of a higher luminance region, which is a white region, in a binarized image. Such detection of the center of gravity is performed for each of all the higher luminance regions in the binarized image. Next, for each of all the higher luminance regions in the binarized image, dust detector 112 discriminates whether or not the luminance of the position in the BW image corresponding to the center of gravity of the higher luminance region (hereinafter referred to as a center of gravity corresponding position) is less than a second threshold. That is, dust detector 112 discriminates whether or not the higher luminance region satisfies the above-described second condition. Consequently, dust detector 112 decides, as a candidate for the dust region, a higher luminance region corresponding to the center of gravity corresponding position which has been discriminated to have a luminance of less than the second threshold. For example, as shown in FIG. 11, dust detector 112 detects each of the five higher luminance regions A to E as candidates for the dust region. That is, the IR image or the binarized image is regionally segmented into five dust candidate regions A to E and a non-dust region that is not a dust region.

Figure 12:
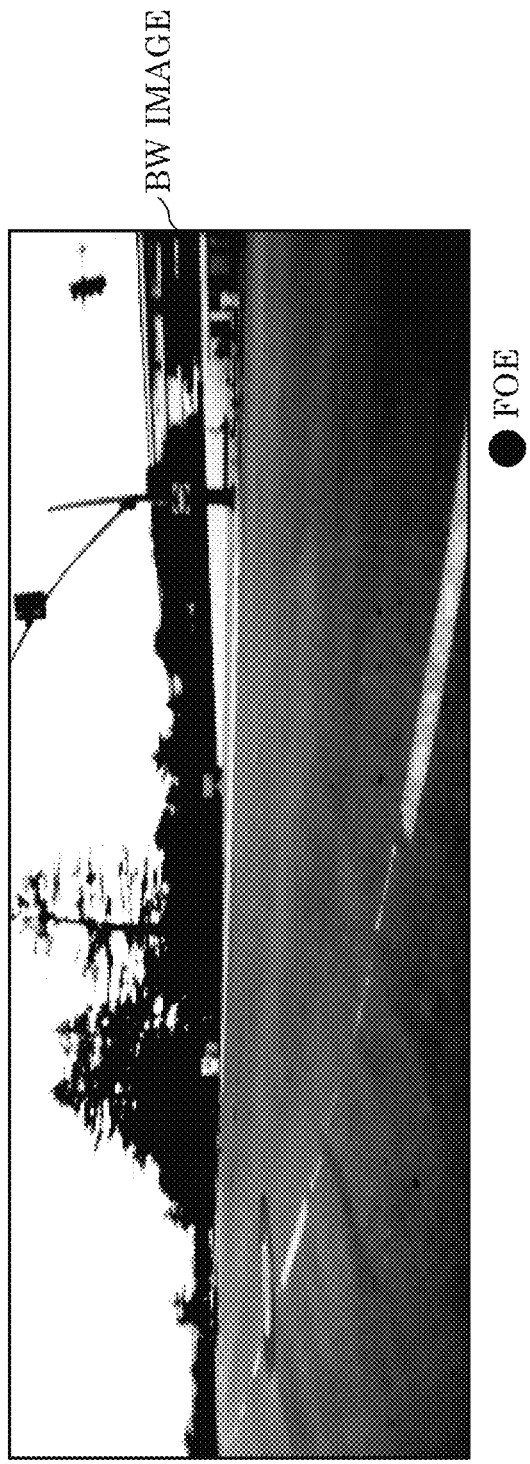
FIG. 12 is a diagram illustrating an example of FOE detected for a BW image.

FIG. 12 shows an example of FOE which is detected for a BW image.

FOE detector 117 detects optical flows from, for example, a multiple-frame BW image including, for example, the BW image shown in FIG. 9B, and detects an FOE by finding the intersection of the optical flows by robust estimation such as Random Sample Consensus (RANSAC).

Figure 13:
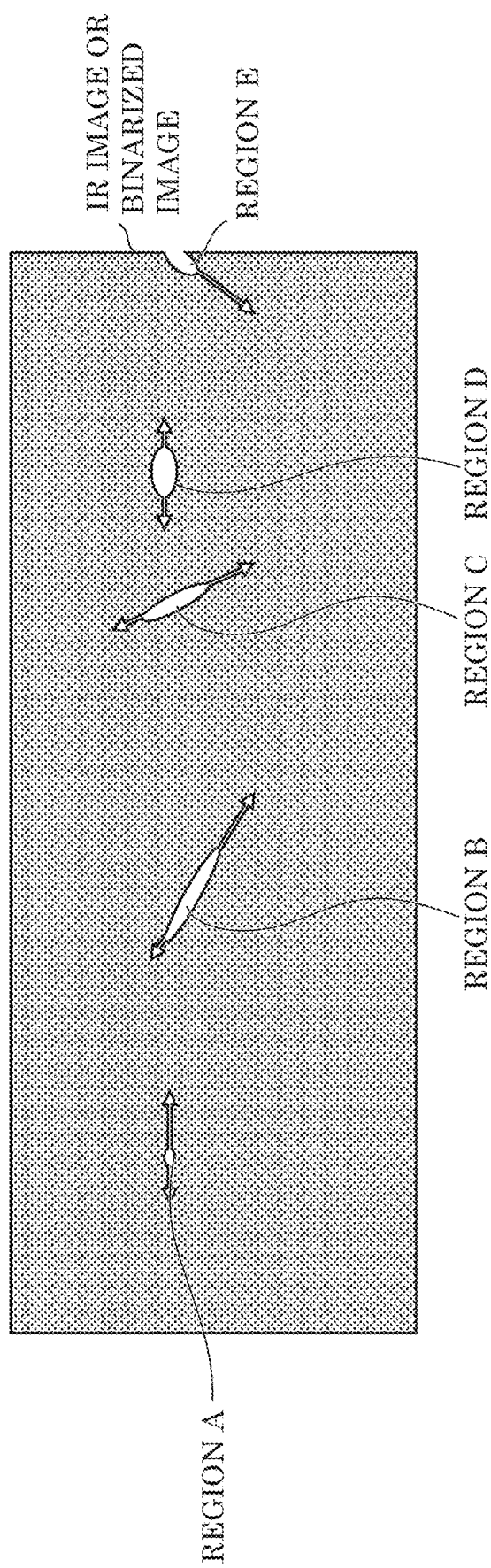
FIG. 13 is a diagram illustrating an example of a principal axis detected for a dust region.

FIG. 13 shows an example of a principal axis to be detected for dust candidate regions A to E.

Dust detector 112 detects the principal axis for each of the dust candidate regions A to E detected as shown in FIG. 11. Specifically, dust detector 112 detects the first principal component axis as the principal axis of the dust candidate region by performing principal component analysis on each pixel of the dust candidate region in the IR image or the binarized image.

Figure 14:
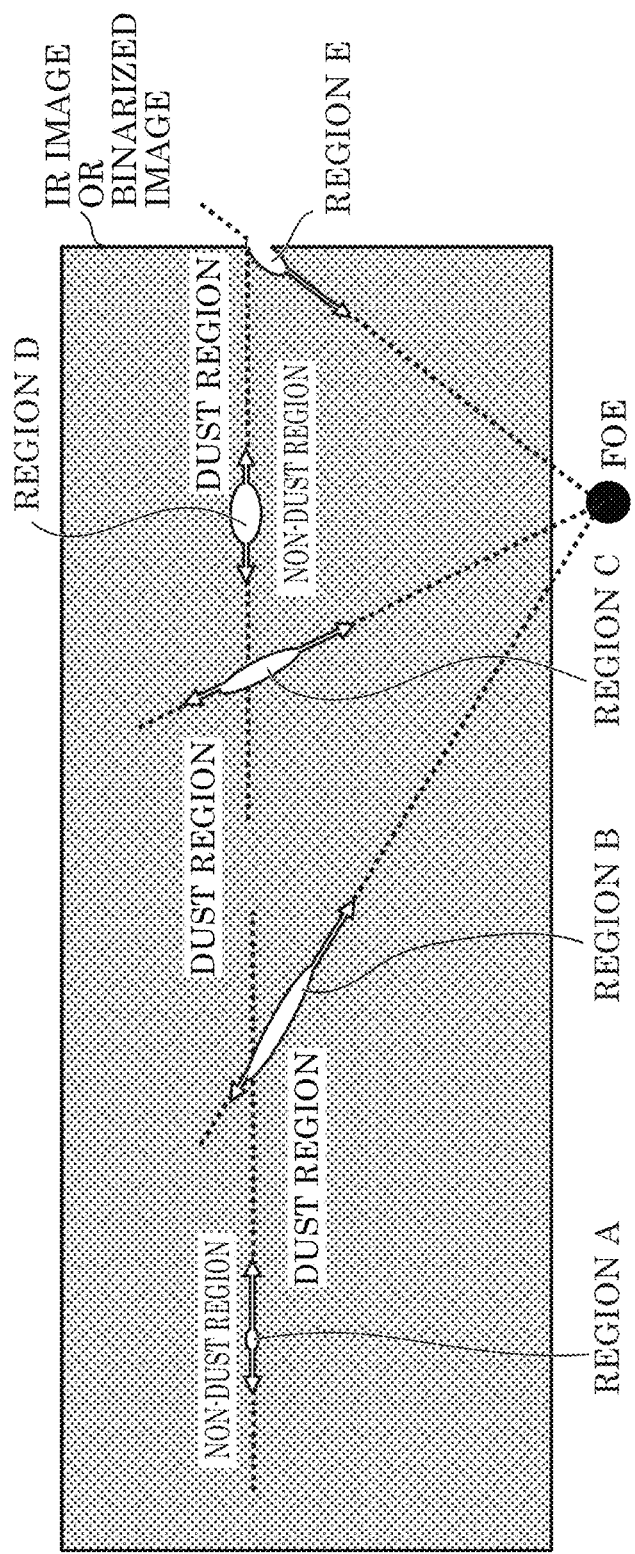
FIG. 14 is a diagram illustrating examples of a dust region and a non-dust region.

FIG. 14 shows an example of a dust region and a non-dust region.

For each of the dust candidate regions A to E in the IR image or the binarized image, dust detector 112 determines whether or not the principal axis of the dust candidate region or an extension line of the principal axis intersects the FOE detected by FOE detector 117. That is, dust detector 112 determines whether or not the dust candidate region satisfies the above-described first condition. Then, dust detector 112 detects, as a dust region, a dust candidate region having a principal axis or an extension line that intersects the FOE, and detects, as a non-dust region, a dust candidate region having a principal axis or an extension line that does not intersect the FOE. For example, as shown in FIG. 14, the extension line of the principal axis of each of dust candidate regions B, C, and E intersect the FOE, and the principal axis and its extension line of each of dust candidate regions A and D do not intersect the FOE. Therefore, dust detector 112 detects dust candidate regions B, C, and E as dust regions, and detects dust candidate regions A and D as non-dust regions.

Figure 15A:
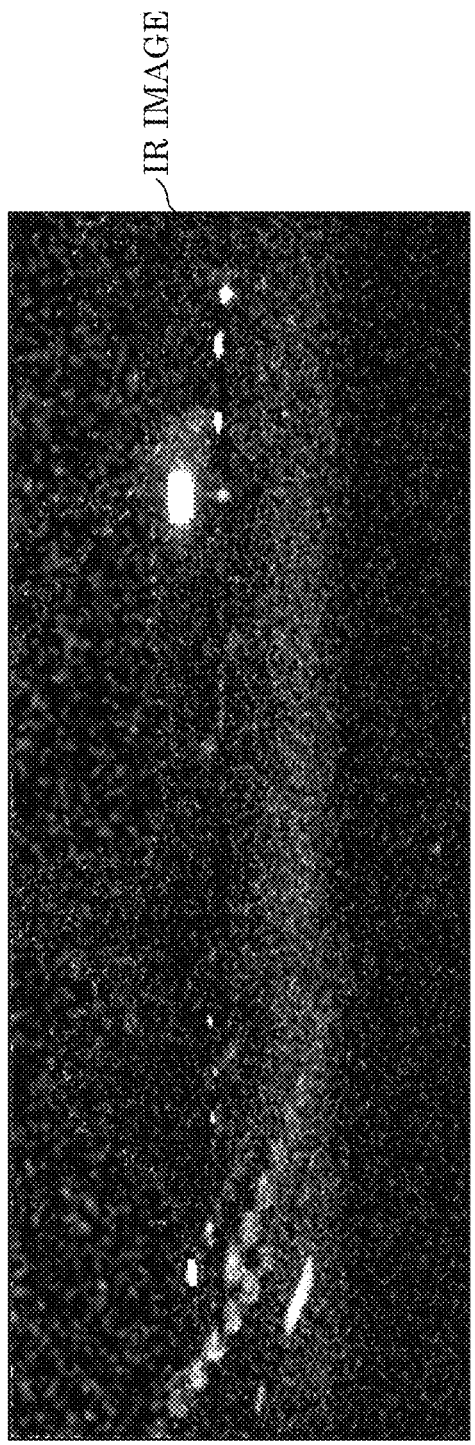
FIG. 15A is a diagram illustrating another example of the IR image.
Figure 15B:
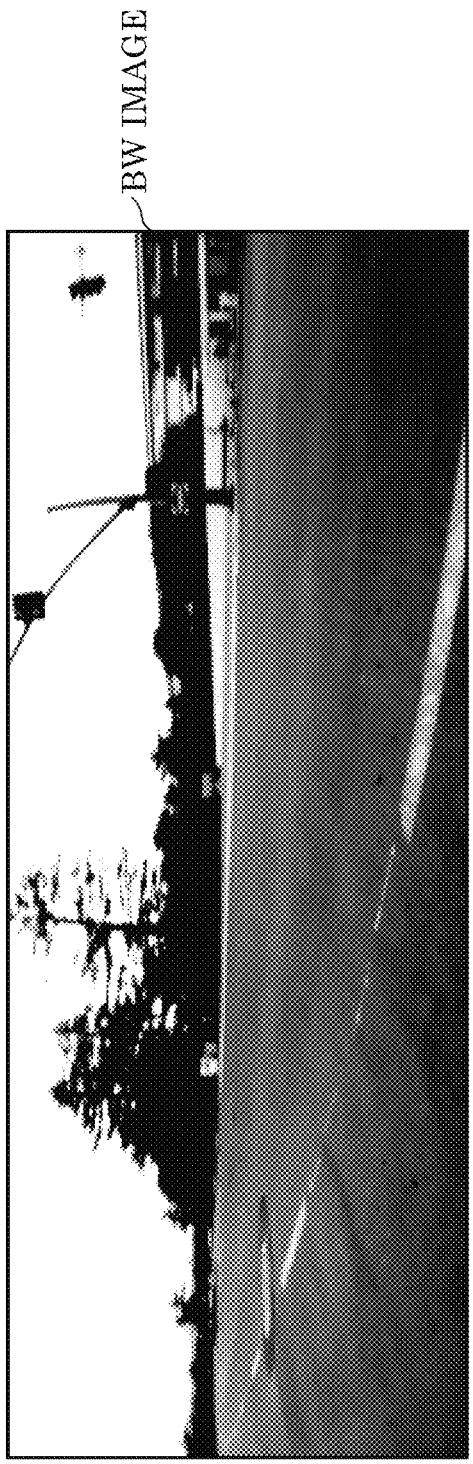
FIG. 15B is a diagram illustrating another example of the BW image.

FIG. 15A shows another example of IR image. FIG. 15B shows another example of BW image.

The BW image shown in FIG. 15B is an image obtained by imaging at a timing different from that of the BW image shown in FIG. 9B. In the BW image shown in FIG. 15B, as in the example shown in FIG. 9B, a scene is projected in which the surroundings of the road on which the vehicle is traveling approaches BW camera 103, by the imaging with BW camera 103 attached to the vehicle. In addition, dust is flying up on this road, for example, due to travelling of a vehicle. Therefore, when IR camera 102 images the same scene as the scene shown in FIG. 15B at the same viewpoint and the same time as those of BW camera 103, the IR image shown in FIG. 15A is acquired.

As shown in FIG. 15A, the IR image acquired in this way has regions of higher luminance. These regions include regions where dust is projected, that is, dust regions. For example, it is confirmed that the dust region exists in the left part of the IR image. On the other hand, as in the example shown in FIG. 9B, no dust is projected on the BW image.

Figure 16:
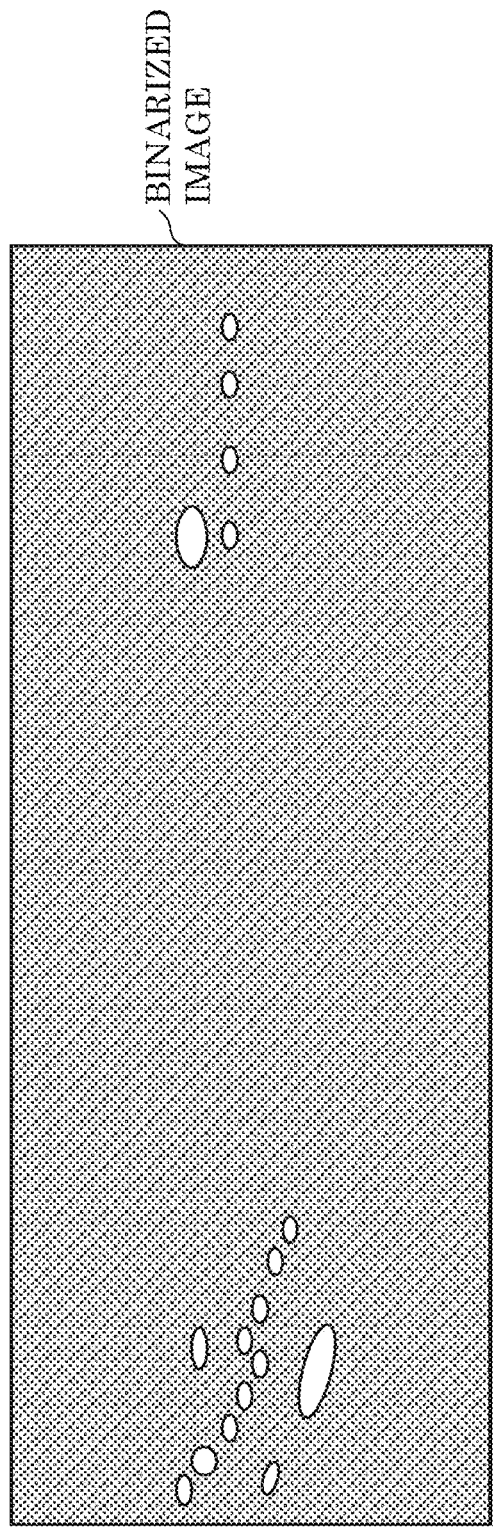
FIG. 16 is a diagram illustrating an example of a binarized image obtained by binarization of an IR image.

FIG. 16 shows an example of a binarized image obtained by binarizing an IR image.

In the IR image shown in FIG. 15A, higher-luminance-region detector 116 detects a region having a luminance not less than the first threshold, as a higher luminance region. That is, higher-luminance-region detector 116 binarizes the luminance at each position (that is, each pixel) in the IR image. Consequently, for example, as shown in FIG. 16, a binarized image consisting of a white region and a black region (hatched region in FIG. 16) is generated.

Figure 17:
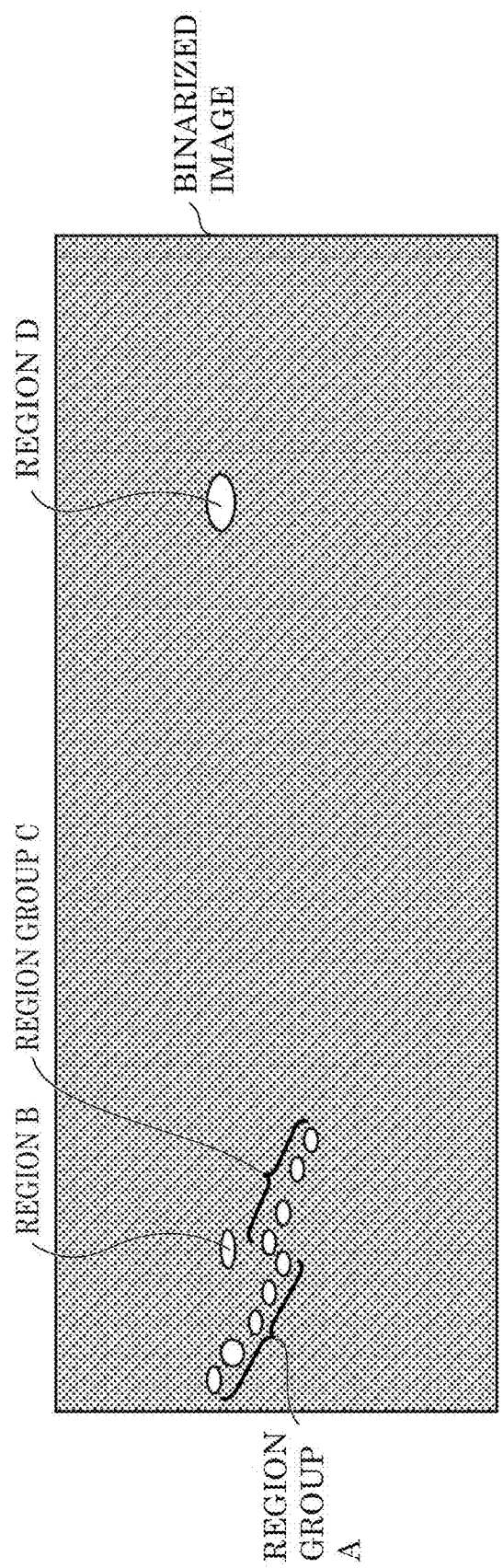
FIG. 17 is a diagram illustrating an example of a dust candidate region in an IR image.

FIG. 17 shows an example of a candidate of dust region in an IR image.

Dust detector 112 first detects the center of gravity of a higher luminance region, which is a white region in the binarized image. Such detection of the center of gravity is performed for each of all the higher luminance regions in the binarized image. Next, dust detector 112 discriminates, for each of all the higher luminance regions in the binarized image, whether or not the luminance of the position in the BW image corresponding to the center of gravity of the higher luminance region (that is, center of gravity corresponding position) is less than the second threshold. That is, dust detector 112 discriminates whether or not the higher luminance region satisfies the above-described second condition. Consequently, dust detector 112 decides, as a candidate for the dust region, a higher luminance region corresponding to the center of gravity corresponding position which has been discriminated to have a luminance of less than the second threshold. For example, as shown in FIG. 17, dust detector 112 detects, as a candidate for the dust region, each of region group A consisting of a plurality of higher luminance regions, higher luminance region B, region group C consisting of a plurality of higher luminance regions, and higher luminance region D. That is, the IR image or binarized image is regionally segmented into dust candidate regions and non-dust regions each of which is not a dust region. The dust candidate regions consist of each region included in region group A, region B, each region included in region group C, and region D.

Figure 18:
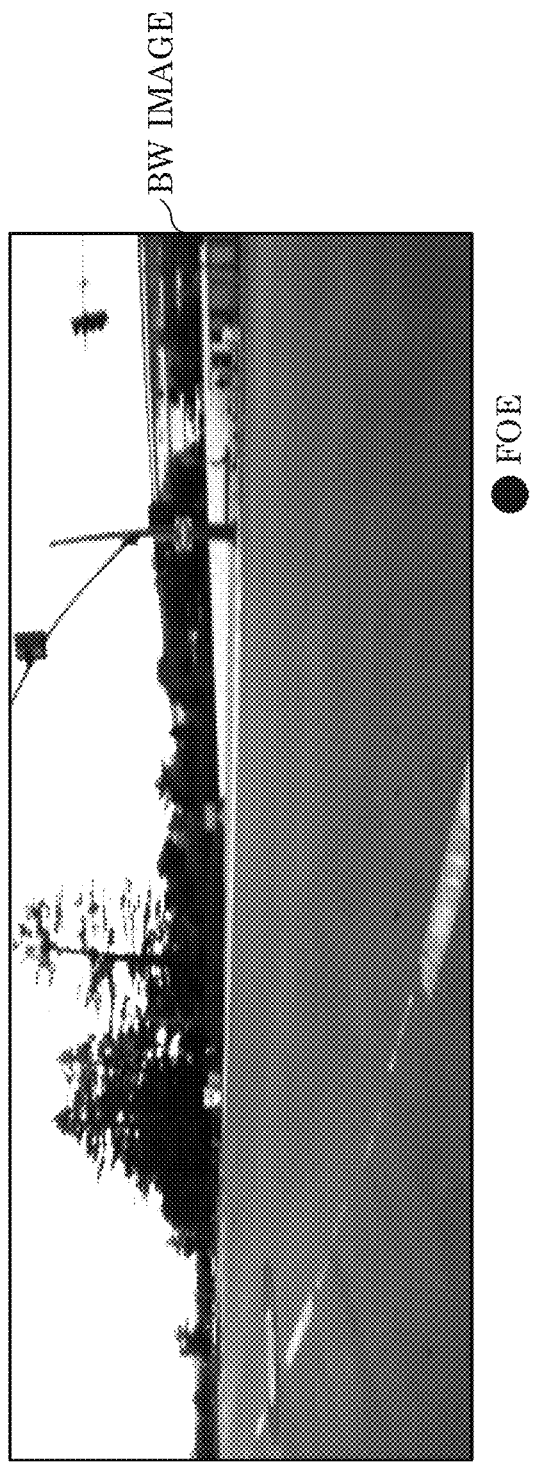
FIG. 18 is a diagram illustrating an example of FOE detected for a BW image.

FIG. 18 shows an example of FOE which is detected for a BW image.

FOE detector 117 detects optical flows from, for example, a multiple-frame BW image including, for example, the BW image shown in FIG. 15B, and detects an FOE by finding the intersection of the optical flows by robust estimation such as Random Sample Consensus (RANSAC).

Figure 19:
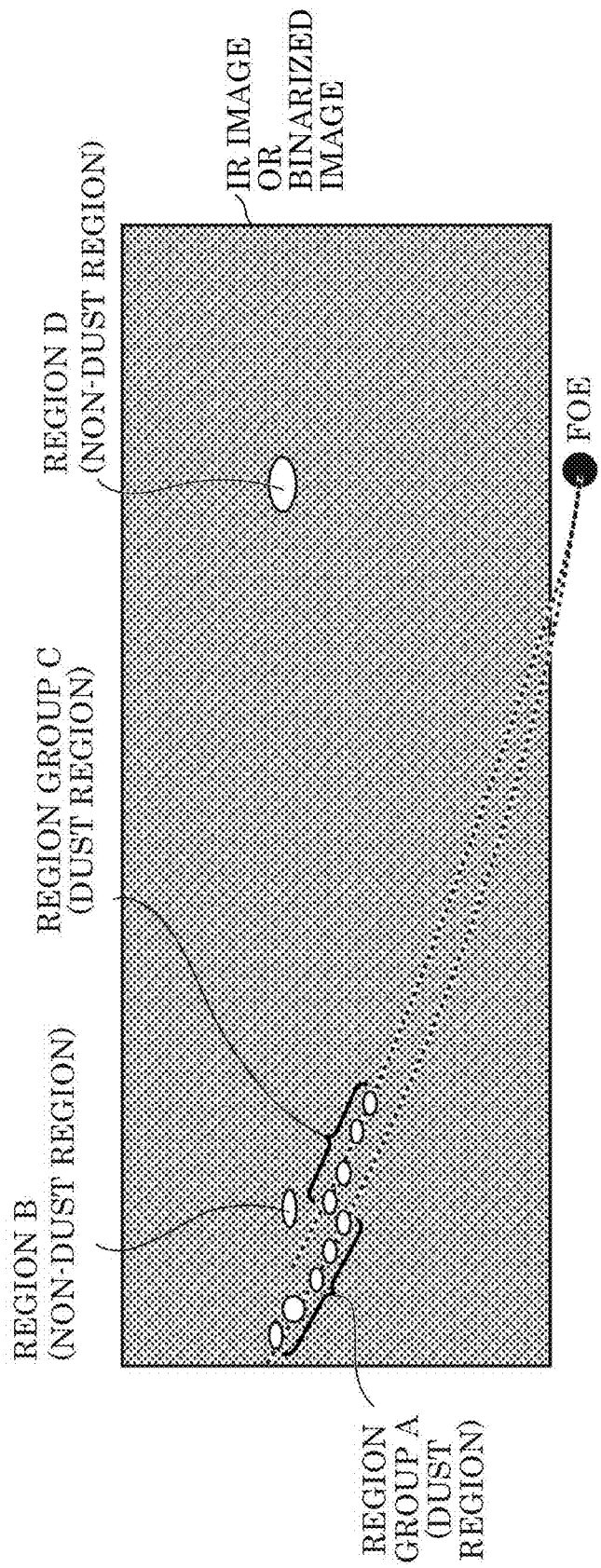
FIG. 19 is a diagram illustrating an example of arrangement of each dust candidate region.

FIG. 19 shows an example of arrangement of each dust candidate region.

For example, when the speed of a vehicle on which IR camera 102 is mounted is high, the same dust is projected on a plurality of places in one frame of IR image due to exposures at mutually different timings in the frame cycle, as described above. Since the dust is moving in such a way to be blown out from the FOE, the dust regions which are located in each of the plurality of places, and the FOE are arranged on a straight line. Further, when a wide-angle lens or a fisheye lens is used as the lens of IR camera 102, the distortion of the lens is large. When the influence of lens distortion is large, the optical flows, which are apparent movement on the screen, do not intersect at one point, so that each dust region and FOE do not exist on a straight line. In this way, when the distortion of the lens is large, each dust region and FOE are arranged on an arc due to the influence of lens distortion.

In the case of the example shown in FIG. 19, dust detector 112 determines whether or not each of each dust candidate region of region group A, dust candidate region B, each dust candidate region of region group C, and dust candidate region D, which are detected as shown in FIG. 17, are arranged on arc along with the FOE. That is, when making determination for one dust candidate region, dust detector 112 determines whether or not the center of gravity of the dust candidate region to be determined is arranged on an arc which intersects the center of gravity of each of at least two other dust candidate regions different from the dust candidate region to be determined, and the FOE of the BW image. That is, dust detector 112 determines whether or not a higher luminance region, which is a dust candidate region, satisfies the above-described first condition. If the center of gravity of the dust candidate region to be determined is arranged on the arc, dust detector 112 detects the dust candidate region as the dust region. On the contrary, if the center of gravity of the dust candidate region to be determined is not arranged on the arc, dust detector 112 detects the dust candidate region as the non-dust region.

Therefore, in the example shown in FIG. 19, since each of the plurality of dust candidate regions included in region group A and the FOE are arranged on an arc, dust detector 112 detects, as the dust region, each of the plurality of dust candidate regions included in region group A. Similarly, since each of the plurality of dust candidate regions included in region group B and the FOE are arranged on an arc, dust detector 112 also detects, as the dust region, each of the plurality of dust candidate regions included in region group B. On the other hand, since each of dust candidate regions B and D is not arranged on the arc intersecting at least two other dust candidate regions and the FOE, dust detector 112 detects, as the non-dust region, each of dust candidate regions B and D.

It is noted that when the distortion of lens is large, dust detector 112 may perform distortion correction processing for the BW image and the IR image, which have been imaged. For example, dust detector 112 may perform distortion correction processing by using a camera calibration method such as Non Patent Literature (R. Tsai, "A versatile camera calibration technique for high-accuracy 3D machine vision metrology using off-the-shelf TV cameras and lenses", IEEE Journal on Robotics and Automation, Vol. 3, Iss. 4, pp. 323-344, 1987). In this case, if the dust candidate region to be determined is arranged on a straight line intersecting at least two other dust candidate regions and the FOE in an IR image or its binarized image which has been subjected to the distortion correction processing, dust detector 112 detects, as the dust region, the dust candidate region to be determined.

Figure 20:
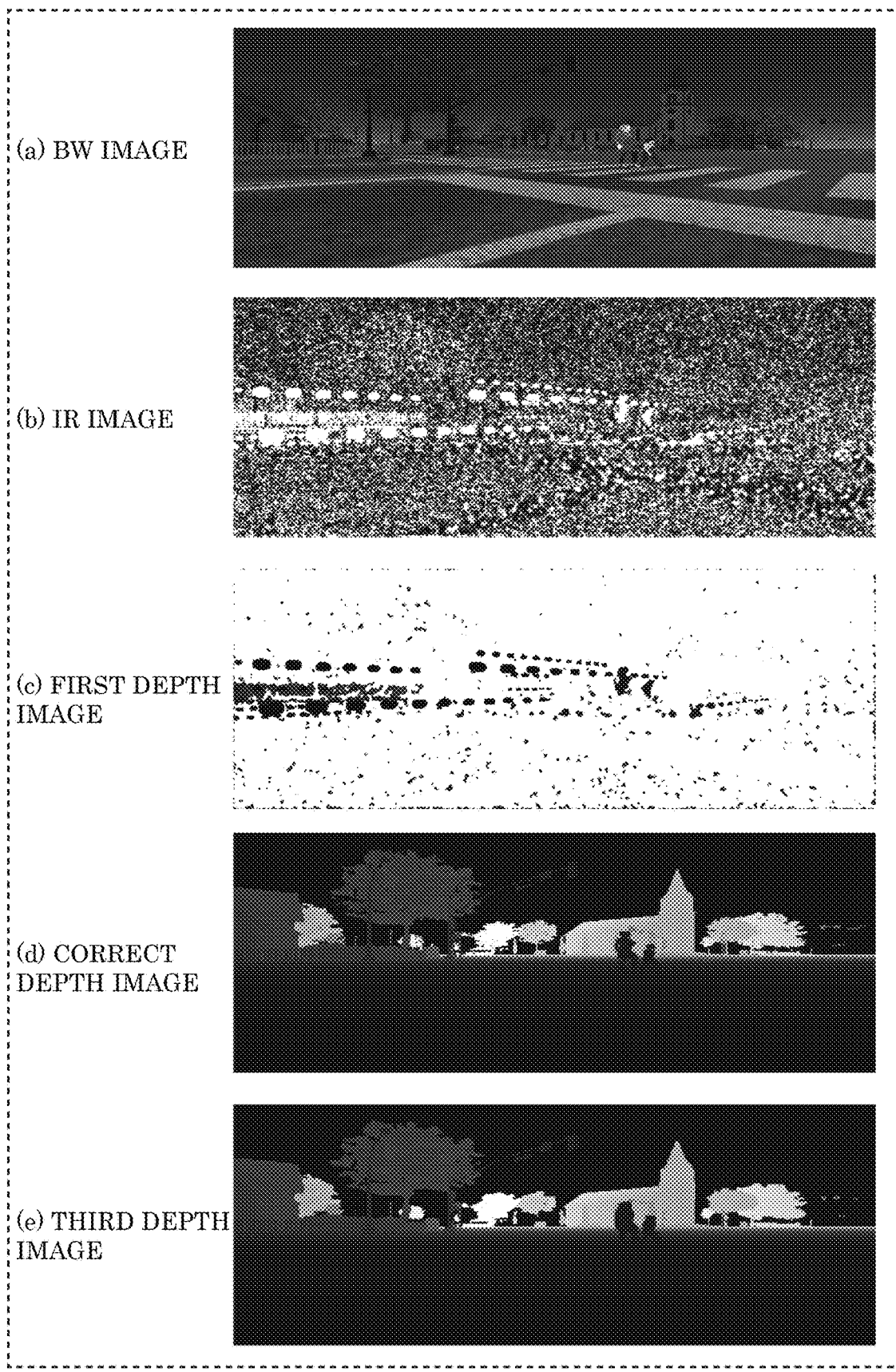
FIG. 20 is a diagram illustrating a simulation result of a depth acquisition device in Embodiment.

FIG. 20 shows a simulation result of depth acquisition device 1.

Depth acquisition device 1 acquires a BW image shown in (a) of FIG. 20 by imaging with BW camera 103, and further acquires an IR image shown in (b) of FIG. 20 by imaging with IR camera 102. These BW and IR images are images obtained by imaging the same scene at the same viewpoint and at the same time. In the example shown in (b) of FIG. 20, some dust regions exist in the IR image.

First depth estimator 111a generates first depth information shown in (c) of FIG. 20 by estimating depth from the IR image. This first depth information is expressed as a first depth image which indicates the depth at each position in the IR image by luminance. In this first depth image, the depth of the dust region is inappropriately expressed.

Second depth estimator 111b corrects the inappropriate depth in the dust region. Then, as shown in (e) of FIG. 20, outputter 118 generates third depth information which indicates the corrected depth of the dust region and the depth of the non-dust region. Like the first depth information, this third depth information is also expressed as a third depth image in which the depth is indicated by luminance. It is noted that second depth estimator 111b may also correct the depth of the non-dust region in the first depth image based on the corresponding region of the BW image.

In this way, in depth acquisition device 1 in the present embodiment, it is possible to bring the third depth image closer to the correct depth image shown in (d) of FIG. 20 in the entire image including dust regions.

[Specific Processing Flow of Depth Acquisition Device]

Figure 21:
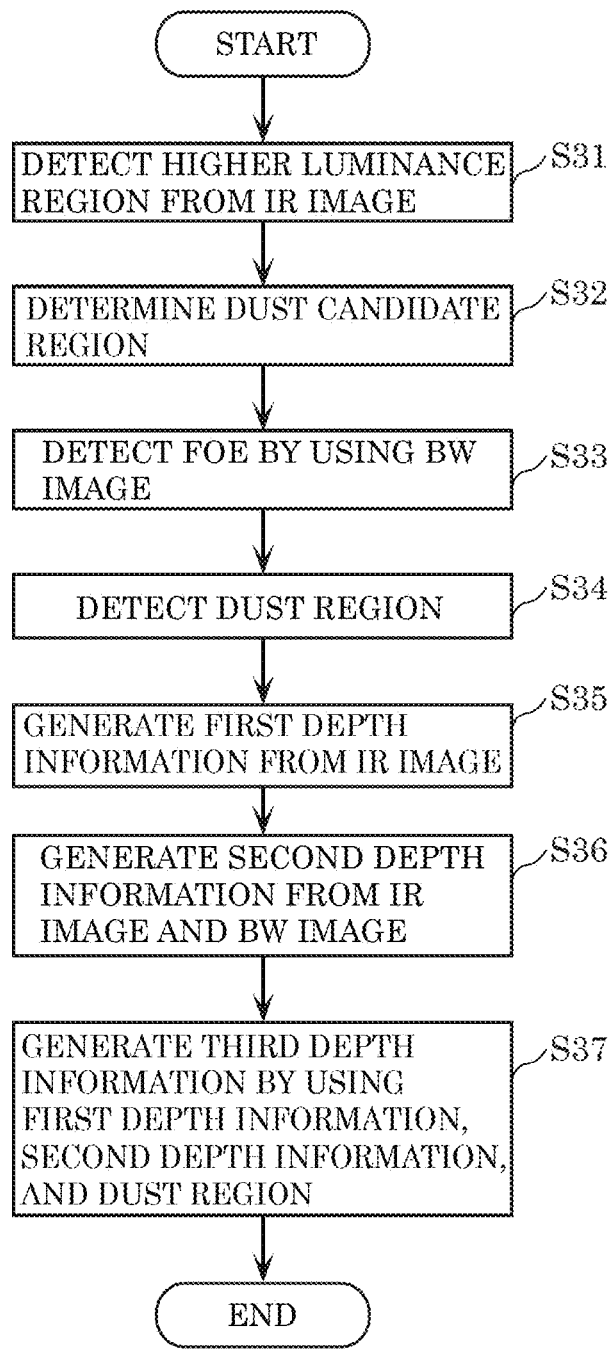
FIG. 21 is a flowchart illustrating an example of overall processing operation of the depth acquisition device shown in FIG. 8.

FIG. 21 is a flowchart illustrating overall processing operation of depth acquisition device 1 shown in FIG. 8.

(Step S31)

First, higher-luminance-region detector 116 detects a higher luminance region from an IR image.

(Step S32)

Dust detector 112 decides whether or not the higher luminance region is a dust candidate region. As a result of this, the IR image is divided into dust candidate regions and non-dust regions.

(Step S33)

FOE detector 117 detects FOE by using a BW image.

(Step S34)

Dust detector 112 detects a dust region based on the dust candidate regions and FOE. As a result of this, the IR image is divided into dust regions and non-dust regions.

(Step S35)

First depth estimator 111a generates first depth information from the IR image by using, for example, TOF.

(Step S36)

Second depth estimator 111b generates second depth information indicating the depth of dust regions, based on the first depth information of the IR image and the BW image.

(Step S37)

Outputter 118 generates third depth information by replacing the depth of dust regions indicated by the first depth information with the depth indicated by the second depth information.

Figure 22:
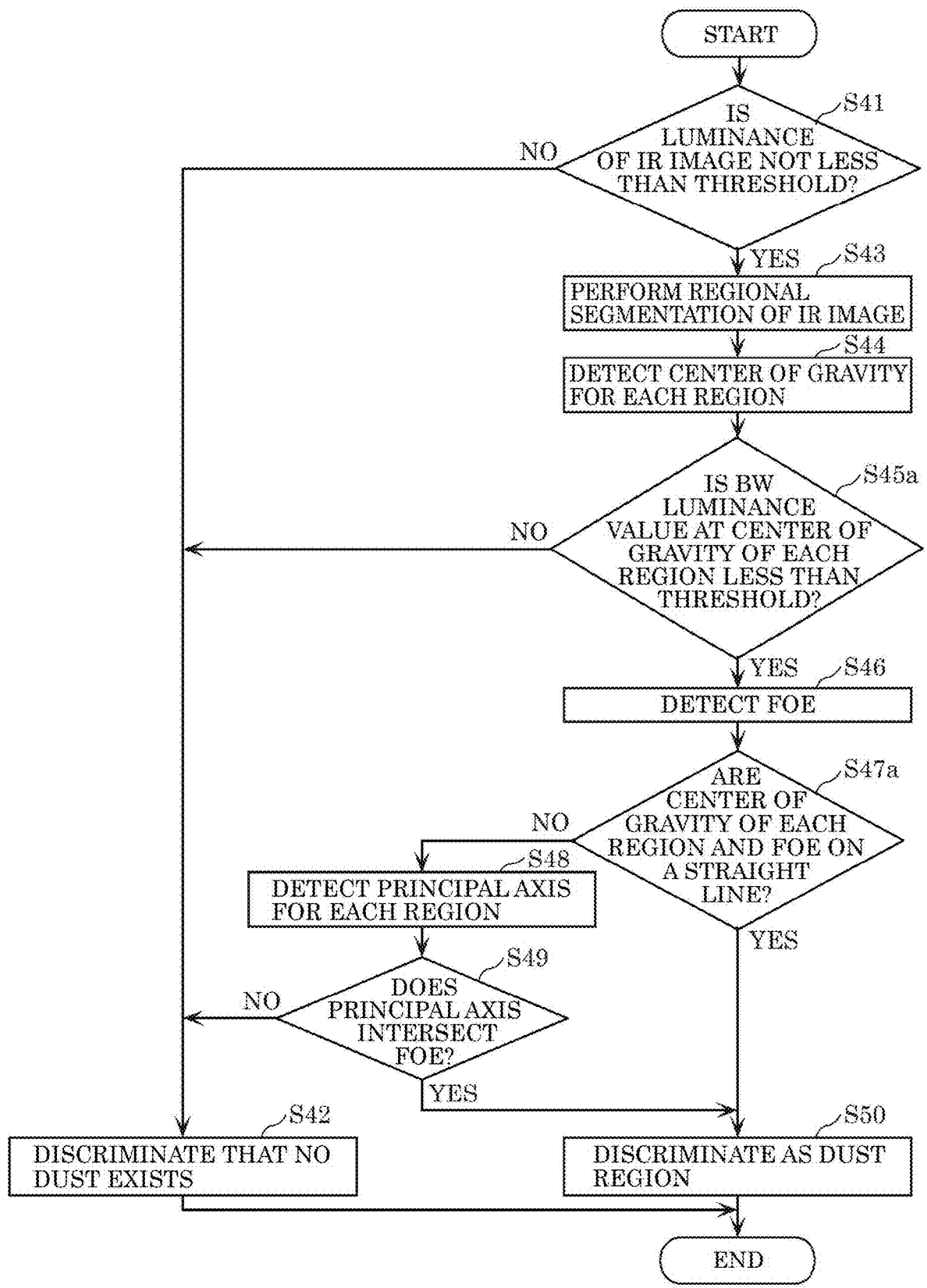
FIG. 22 is a flowchart illustrating an example of detailed processing of steps S31 to S34 of FIG. 21.

FIG. 22 is a flowchart illustrating an example of detailed processing of steps S31 to S34 of FIG. 21.

(Step S41)

First, higher-luminance-region detector 116 determines whether or not the luminance at each position in the IR image is not less than a first threshold. Here, the first threshold may be about 256, for example, if the IR image is an image with 12-bit gradation. Of course, this first threshold may be a value that varies according to environmental conditions or settings of IR camera 102. For example, when a dark scene such as night is imaged, since the luminance of the entire IR image will be lower, the first threshold may be a smaller value than when a bright scene in daytime is imaged. Moreover, when the exposure time of IR camera 102 is long, since the luminance of the entire IR image will be higher, the first threshold may be a larger value than when the exposure time is short.

(Step S42)

Here, upon determining that the luminance at any position is not equal to or greater than the first threshold (No in step S41), higher-luminance-region detector 116 determines that dust is not projected on the IR image. That is, the entire IR image is determined as a non-dust region.

(Step S43)

On the other hand, upon determining that the luminance at any position is not less than the first threshold (Yes in step S41), higher-luminance-region detector 116 performs regional segmentation of the IR image. That is, higher-luminance-region detector 116 segments the IR image into at least one higher luminance region and a region other than the higher luminance region. For this regional segmentation, a method based on luminance such as Super Pixel may be used. It is noted that, higher-luminance-region detector 116 may perform a filtering process taking advantage of the size of the region for that regional segmentation. For example, if the number of pixels in a higher luminance region is not more than a predetermined number, higher-luminance-region detector 116 may delete the higher luminance region. That is, even if higher-luminance-region detector 116 detects a higher luminance region, when the number of pixels in the region is small, the higher luminance region may be reclassified into a region other than the higher luminance region.

(Step S44)

Next, for each of the at least one higher luminance region detected by the regional segmentation in step S43, dust detector 112 detects the center of gravity of the higher luminance region. Specifically, dust detector 112 detects the center of gravity of a higher luminance region by calculating an average value of each of the X-axis coordinate positions and the Y-axis coordinate positions of a plurality of pixels included in the higher luminance region.

(Step 545a)

Dust detector 112 determines whether or not the luminance of the position in the BW image corresponding to the center of gravity of the higher luminance region (that is, a center of gravity corresponding position) is less than the second threshold. That is, dust detector 112 determines whether or not the higher luminance region satisfies the second condition. Upon determining that the luminance is not less than the second threshold (No in step 545a), dust detector 112 discriminates the higher luminance region as the non-dust region (step S42). That is, in this case, it is estimated that a subject having a high light reflectance is projected on each of the higher luminance region of the IR image and the region corresponding to the higher luminance region in the BW image. Therefore, in this case, the higher luminance region is discriminated as a non-dust region. It is noted that the second threshold may be, for example, about 20,000 if the BW image is an image with 12-bit gradation. Of course, this second threshold may be a value that varies according to the environmental conditions or settings of BW camera 103. For example, when a dark scene such as night is imaged, since the luminance of the entire BW image will be lower, the second threshold may be a smaller value than when a bright scene in daytime is imaged. Moreover, when the exposure time of BW camera 103 is long, since the luminance of the entire BW image will be higher, the second threshold may be a larger value than when the exposure time is short.

(Step S46)

On the other hand, when dust detector 112 determines that the luminance of the center of gravity corresponding position is less than the second threshold (Yes in step S45a), FOE detector 117 detects an FOE based on the BW image.

(Step S47a)

Dust detector 112 determines whether or not the centers of gravity of three or more dust candidate regions detected in step S44 and the FOE are arranged on a straight line. That is, dust detector 112 determines whether or not the dust candidate region satisfies the above-described first condition. Specifically, dust detector 112 performs fitting of the center of gravity of each of the three or more dust candidate regions with a straight line intersecting the FOE, and determines whether or not an error (that is, a distance) between the straight line and each center of gravity is not more than a permissible value. Thereby, it is determined whether or not the center of gravity of each of the three or more dust candidate regions and the FOE are arranged on a straight line. If the error is not more than the permissible value, it is determined that the centers of gravity of the dust candidate regions and the FOE are arranged on a straight line, and if the error is not equal to or less than the permissible value, it is determined that the centers of gravity of the dust candidate regions and the FOE are not arranged on a straight line.

(Step S50)

Upon determining that the center of gravity of each dust candidate region and FOE are arranged on a straight line (Yes in step 547a), dust detector 112 discriminates, as the dust region, those dust candidate regions.

(Step S48)

On the other hand, upon determining that the centers of gravity of three or more dust candidate regions and FOE are not arranged on a straight line (No in step S47), dust detector 112 detects a principal axis of each dust candidate region.

(Step S49)

Next, dust detector 112 determines whether or not the principal axis or its extension line of each dust candidate region detected in step S48 intersects the FOE. That is, dust detector 112 determines whether or not the dust candidate region satisfies another first condition different from the first condition in step S47a. Here, upon determining that the principal axis or its extension line intersects the FOE (Yes in step S49), dust detector 112 discriminates, as the dust region, the dust candidate region having the principal axis (step S50). On the other hand, upon determining that the principal axis or its extension line does not intersect the FOE (No in step S49), dust detector 112 discriminates, as the non-dust region, the dust candidate region having the principal axis (step S42).

In such a method, an IR image and a BW image whose viewpoint positions are substantially the same are required. In depth acquisition device 1 of the present embodiment, the filter to be used for each pixel is set to either an IR filter or a BW filter for each pixel. That is, as shown in FIG. 2, first pixel 21 having an IR filter and second pixel 22 having a BW filter are alternately arranged in the column direction. As a result of this, the IR image and the BW image at substantially the same viewpoint and the same time can be acquired so that it is possible to appropriately discriminate the dust region.

Figure 23:
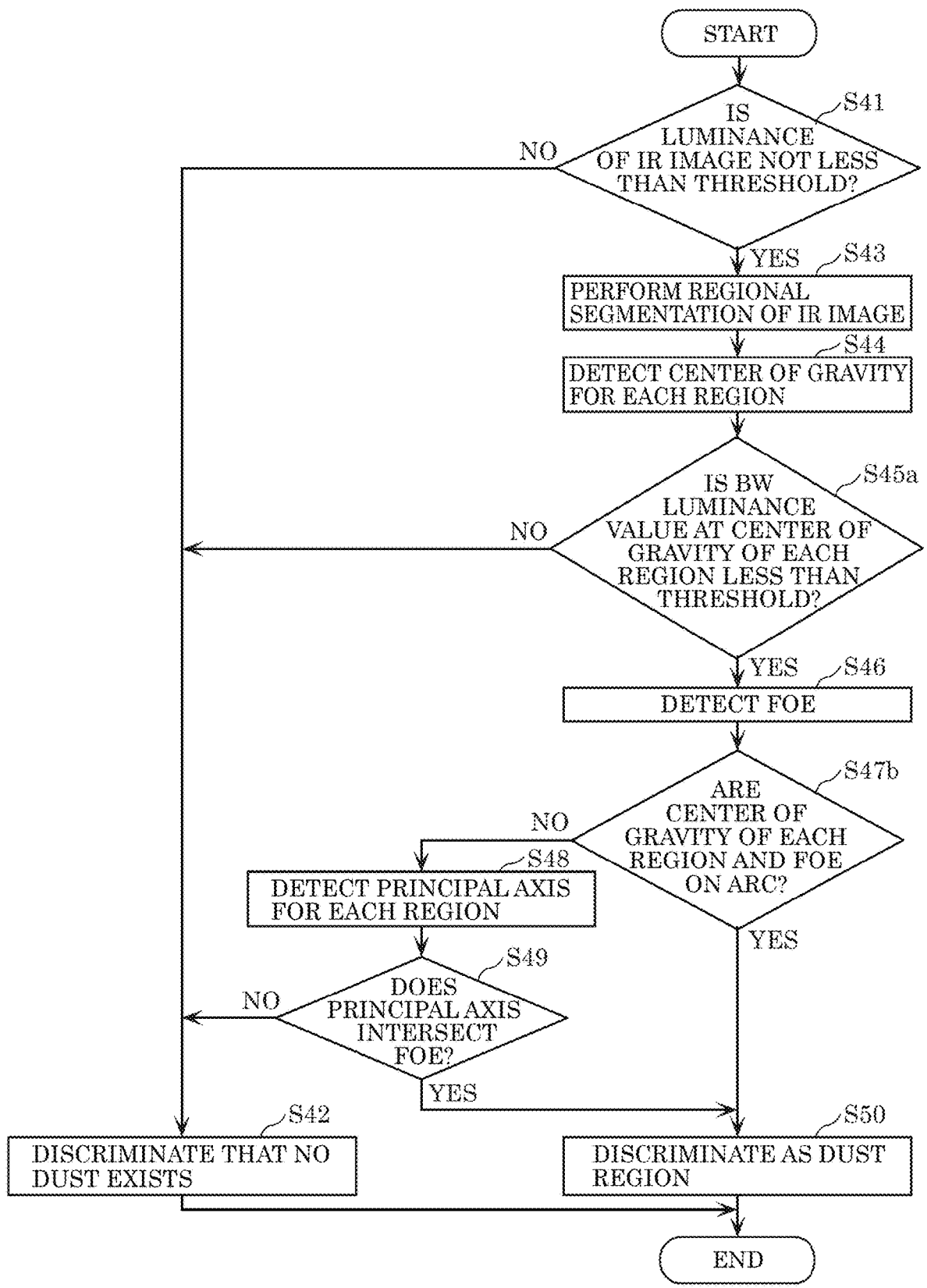
FIG. 23 is a flowchart illustrating another example of detailed processing of steps S31 to S34 of FIG. 21.

FIG. 23 is a flowchart illustrating another example of detailed processing of steps S31 to S34 of FIG. 21. The flowchart shown in FIG. 23 includes step S47b in place of step S47a of each step of the flowchart of FIG. 22.

(Step S47b)

For example, when the distortion of the lens of IR camera 102 is large, each dust region and the FOE are not arranged on a straight line, but are arranged on an arc according to the lens distortion as described above.

Therefore, dust detector 112 may determine whether or not the centers of gravity of the three or more dust candidate regions detected in step S44 and the FOE are arranged on an arc. Specifically, dust detector 112 obtains an approximation curve of respective centers of gravity of the three or more dust candidate regions and the FOE, and determines whether or not the error (that is, the distance) between the approximation curve and each center of gravity is not more than a permissible value. As a result, it is determined whether or not the center of gravity of each of the three or more dust candidate regions and the FOE are arranged on an arc. That is, if the error is not more than the permissible value, it is determined that the centers of gravity of those dust candidate regions and the FOE are arranged on an arc, and if the error is not equal to or less than the permissible value, it is determined that the centers of gravity of those dust candidate regions and the FOE are not arranged on the arc. The above-described approximation curve is represented by a curve of an order of the number which is not more than the number of three or more dust candidate regions to be determined.

Further, in step S46, FOE detector 117 may detect optical flows from a plurality of IR images instead of the BW image, obtain an intersection of the optical flows by robust estimation such as RANSAC, and detect the intersection as FOE. Further, FOE detector 117 may detect the movement of IR camera 102 or BW camera 103, and detect FOE through calculation using the movement and internal parameters of IR camera 102 or BW camera 103.

Figure 24:
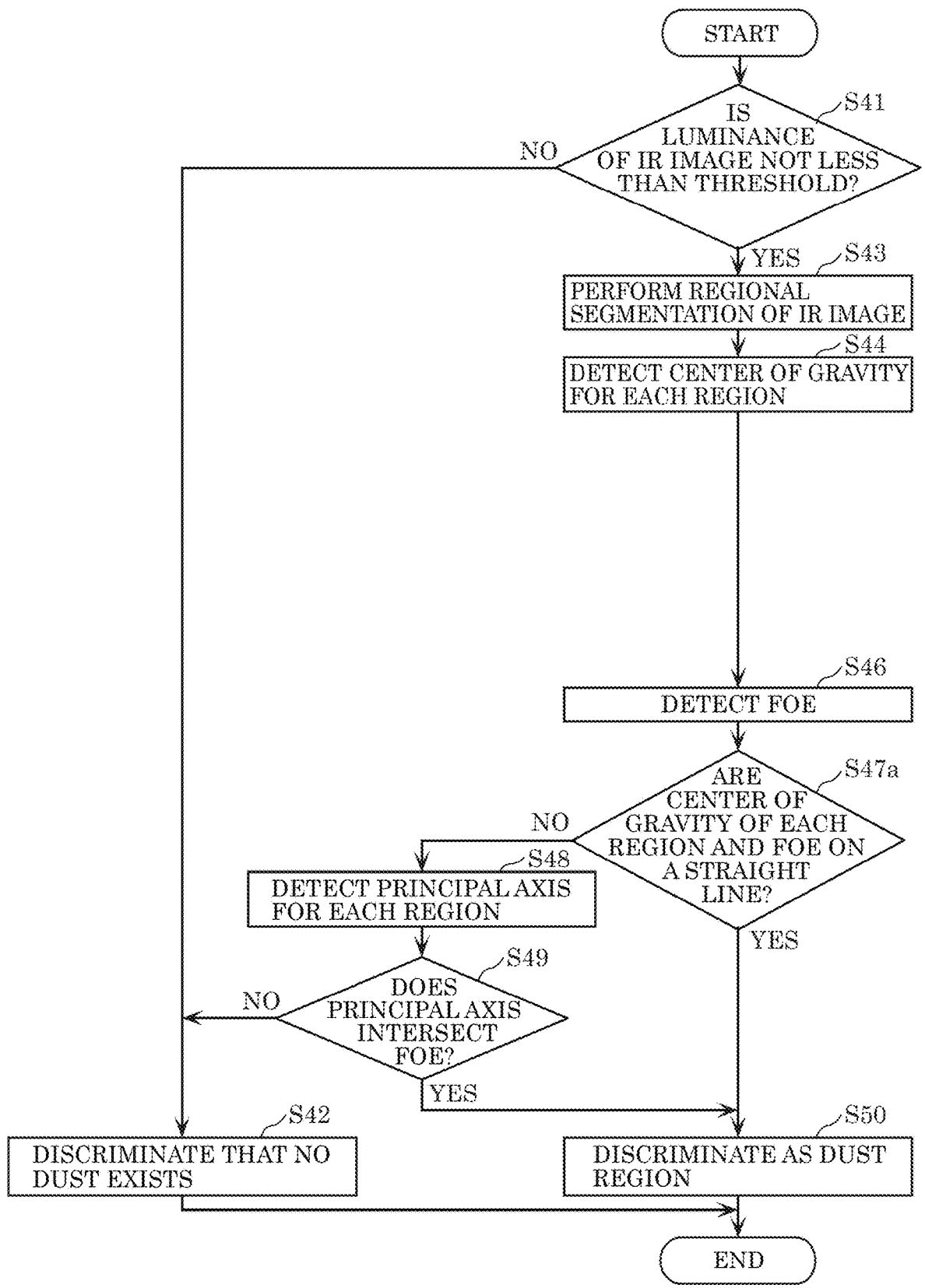
FIG. 24 is a flowchart illustrating an example of alternative processing of steps S31 to S34 of FIG. 21.

FIG. 24 is a flowchart showing an example of alternative processing of steps S31 to S34 in FIG. 21. In the flowchart shown in FIG. 24, step S32 of FIG. 21 is omitted. In other words, in the flowchart shown in FIG. 24, step S45a of the flowchart of FIG. 22 is omitted.

That is, in the examples shown in FIGS. 21 to 23, dust detector 112 determines whether or not a higher luminance region is the dust candidate region by taking advantage of the property that dust is observed in the IR image but not in the BW image. That is, as shown in step S45a of each of FIGS. 22 and 23, dust detector 112 determines whether or not the higher luminance region is the dust candidate region based on the luminance of the center of gravity corresponding position in the BW image. However, as shown in the flowchart shown in FIG. 24, dust detector 112 does not have to perform the determination in step S45a. In this case, any higher luminance region obtained by the regional segmentation in step S43 is treated as a dust candidate region.

Figure 25:
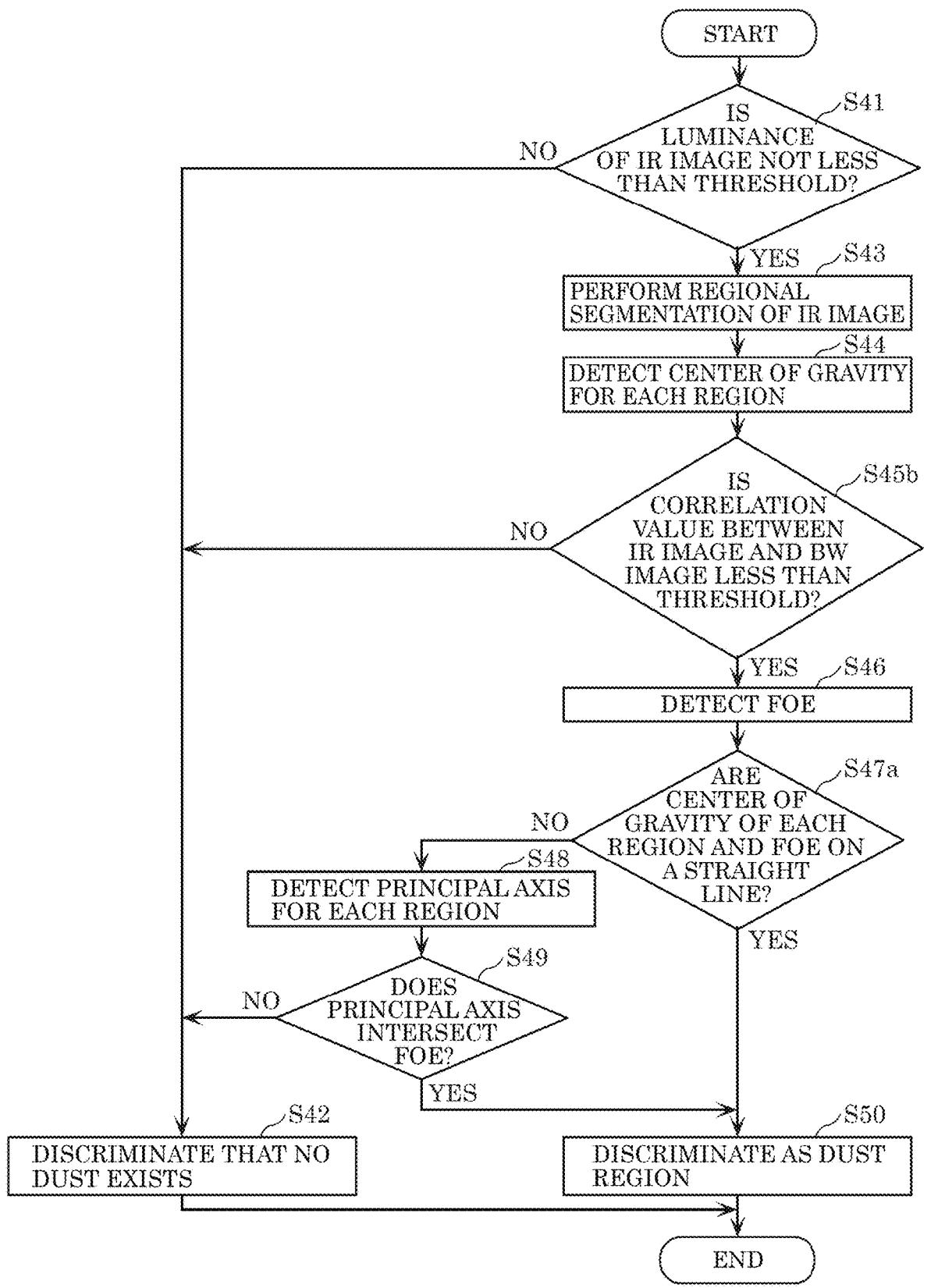
FIG. 25 is a flowchart illustrating another example of detailed processing of steps S31 to S34 of FIG. 21.

FIG. 25 is a flowchart showing another example of the detailed processing of steps S31 to S34 of FIG. 21. The flowchart shown in FIG. 25 includes step S45binstead of step S45a in each step of the flowchart of FIG. 22.

In order to determine the dust candidate region, the property that dust is observed in an IR image but not in a BW image may be used more positively. For example, the correlation coefficient between the IR image and the BW image may be used as the property. As described above, if dust exists, the dust is projected on the IR image, but the dust is not projected on the BW image. That is, since a distant subject is projected on the BW image, the images are significantly different between the IR image and the BW image each of which has the same viewpoint position. Therefore, by judging whether or not the projected subjects are equal by using a correlation coefficient between the IR image and the BW image, it is possible to discriminate whether or not each higher luminance region is the dust candidate region.

(Step S45b)

In step S45b, dust detector 112 calculates a correlation coefficient of luminance between the higher luminance region of the IR image and the region in the BW image corresponding to the higher luminance region (that is, the corresponding region) for each of at least one higher luminance region obtained by the regional segmentation in step S43. The correlation coefficient is obtained by arranging the luminance of each pixel of the IR image and the BW image in a vector shape for each region, calculating the inner product value thereof, and normalizing it with the number of pixels. That is, dust detector 112 normalizes the inner product value between the vector consisting of the luminance of each pixel in the higher luminance region of the IR image and the vector consisting of the luminance of each pixel in the corresponding region of the BW image. As a result, the correlation coefficient for the higher luminance region is calculated.

Then, dust detector 112 determines whether or not the calculated correlation coefficient is less than the third threshold. That is, dust detector 112 determines whether or not the higher luminance region satisfies the above-described second condition. Here, if the correlation coefficient is not less than the third threshold (No in step S45b), it is highly likely that the correlation coefficient is high because the same subject is projected on the higher luminance region of the IR image and the corresponding region of the BW image. Therefore, in this case, dust detector 112 discriminates that the higher luminance region is not the dust region (step S42). On the other hand, when the correlation coefficient is less than the third threshold (Yes in step S45b), there is possibility that the correlation coefficient is low because different subjects are projected on the higher luminance region of the IR image and the corresponding region of the BW image. Therefore, in this case, dust detector 112 discriminates that the higher luminance region is the dust candidate region (step S50).

Further, learning process may be used to implement the discrimination between the dust region and the non-dust region. For the learning process, for example, a process such as Deep Learning may be used. In this case, for performing learning, an IR image and a BW image, and a correct image in which the IR image is segmented into dust regions and non-dust regions are prepared in advance. Next, the IR image and the BW image are given to the learning model as inputs. Then, the learning model is trained such that the output from the learning model with respect to the input matches the correct image. The learning model is, for example, a neural network. The output from the learning model is an image whose each pixel indicates a numeral "0" or a numeral "1", where the numeral "0" indicates that that pixel belongs to a non-dust region, and the numeral "1" indicates that that pixel belongs to a dust region.

By using the learning model that has been trained in advance in this way, dust detector 112 discriminates between a dust region and a non-dust region. That is, dust detector 112 inputs an IR image and a BW image to the learning model as inputs. Then, dust detector 112 discriminates the region including the pixel corresponding to the numeral "0" outputted from the5 learning model, as the non-dust region. Further, dust detector 112 discriminates the region including the pixel corresponding to the numeral "1" outputted from the learning model, as the dust region.

By the processing described so far, dust detector 112 segments an imaged IR image into a dust region in which the dust is projected and a non-dust region in which the dust is not projected.

<Depth Correction Processing>

Second depth estimator 111b generates second depth information by using a BW image, first depth information, and a dust region (that is, discrimination result of the above-described region).

As described above, the noise caused by dust is a phenomenon caused by diffused reflection of infrared light irradiated from light source 101. Therefore, dust that is projected as noise on the IR image is often not projected on the BW image. Accordingly, it is possible to acquire second depth information which is free from effects of the dust projected on the IR image by correcting the first depth information, only for dust regions, by using the BW image instead of the first depth information obtained from the IR image.

For the acquisition of the second depth information, a guided filter which is a type of image correction filter may be used. The guided filter is disclosed in Non Patent Literature (Kaiming He, Jian Sun and Xiaoou Tang, "Guided Image Filtering", IEEE Transactions on Pattern Analysis and Machine Intelligence, Vol. 35, Iss. 6, pp. 1397-1409, 2013). The guided filter is a filter that corrects a target image by using correlation between the target image and a reference image. In the guided filter, it is supposed that a reference image I and a target image p are represented by parameters a and b as indicated by the following (Equation 2).

$$q_i = a_k I_i + b_k, \forall i \in \omega_k \quad \text{(Equation 2)}$$

Where, q indicates an output image obtained by correcting target image p, i indicates the number of each pixel, and wk indicates a peripheral region of pixel k. Moreover, parameters a and b are represented by the following (Equation 3).

$$a_k = \frac{\frac{1}{|\omega|} \sum_{i \in \omega_k} I_i p_i - \mu_k \overline{p}_k}{\sigma_k^2 + \epsilon} \quad \text{(Equation 3)}$$

$$b_k = \overline{p}_k - a_k \mu_k$$

Where, ε is a regularization parameter. Further, μ and σ are the mean and variance in a block of reference image, and are calculated by the following (Equation 4).

$$\mu_k = \frac{1}{|\omega|} \sum_{i \in \omega_k} I_i \quad \text{(Equation 4)}$$

$$\sigma_k^2 = \frac{1}{|\omega|} \sum_{i \in \omega_k} (I_i - \mu_k)^2$$

Where, to suppress noises included in the obtained parameters a and b, the output is obtained as shown in the following (Equation 5) by using averaged parameters.

$$q_i = \overline{a}_k I_i + \overline{b}_k \quad \text{(Equation 5)}$$

$$\overline{a}_k = \frac{1}{|\omega|} \sum_{k \in \omega_i} a_k$$

$$\overline{b}_k = \frac{1}{|\omega|} \sum_{k \in \omega_i} b_k$$

In the present embodiment, second depth estimator 111b corrects the first depth information (or the first depth image) which is the target image by giving a BW image as the reference image. As a result of this, the second depth information is generated or acquired. In order to generate such second depth information, an IR image and a BW image having substantially the same viewpoint position are required. In depth acquisition device 1 of the present embodiment, for each pixel, the filter used for the pixel is set to either the IR filter or the BW filter. That is, as shown in FIG. 2, first pixel 21 having an IR filter and second pixel 22 having a BW filter are alternately arranged in the column direction. As a result of this, an IR image and a BW image, which have a substantially same viewpoint can be acquired, and therefore appropriate second depth information can be acquired.

Of course, second depth estimator 111b may use a process other than the guided filter. For example, second depth estimator 111b may use a process such as bilateral filter (Non Patent Literature: C. Tomasi, R. Manduchi, "Bilateral filtering for gray and color images", IEEE International Conference on Computer Vision (ICCV), pp. 839-846, 1998), or Mutual-Structure for Joint Filtering (Non Patent Literature: Xiaoyong Shen, Chao Zhou, Li Xu and Jiaya Jia, "Mutual-Structure for Joint Filtering", IEEE International Conference on Computer Vision (ICCV), 2015) may be used.

As described above, in the present embodiment, the first depth information is used for a region which is discriminated that dust and the like have not occurred (that is, a non-dust region), and the second depth information is used for the region where dust and the like have occurred (that is, a dust region). As a result of this, even if dust and the like have occurred in the IR image, more accurate depth information can be acquired.

Variation

In the above embodiment, a filter such as a guided filter is used to generate the second depth information, but the second depth information may be generated by using a learning model.

For example, like Non Patent Literature (Shuran Song, Fisher Yu, Andy Zeng, Angel X. Chang, Manolis Savva and Thomas Funkhouser, "Semantic Scene Completion from a Single Depth Image", IEEE Conference on Computer Vision and Pattern Recognition (CVPR), pp. 190-198, 2017), Deep Learning which is learning process may be used. That is, the learning model may be trained such that when the BW image and the first depth information are inputted, the second depth information is outputted. The above Non Patent Literature proposes a network which, when inputted with depth information including a missing region and a color image, interpolates the missing region of the depth information. Second depth estimator 111b in this variation gives an IR image, a BW image, and first depth information to a network (that is, a learning model) similar to that of the Non Patent Literature, and further gives a dust region detected by dust detector 112 as a mask image of the missing region. This makes it possible to acquire more accurate second depth information from the network.

Figure 26:
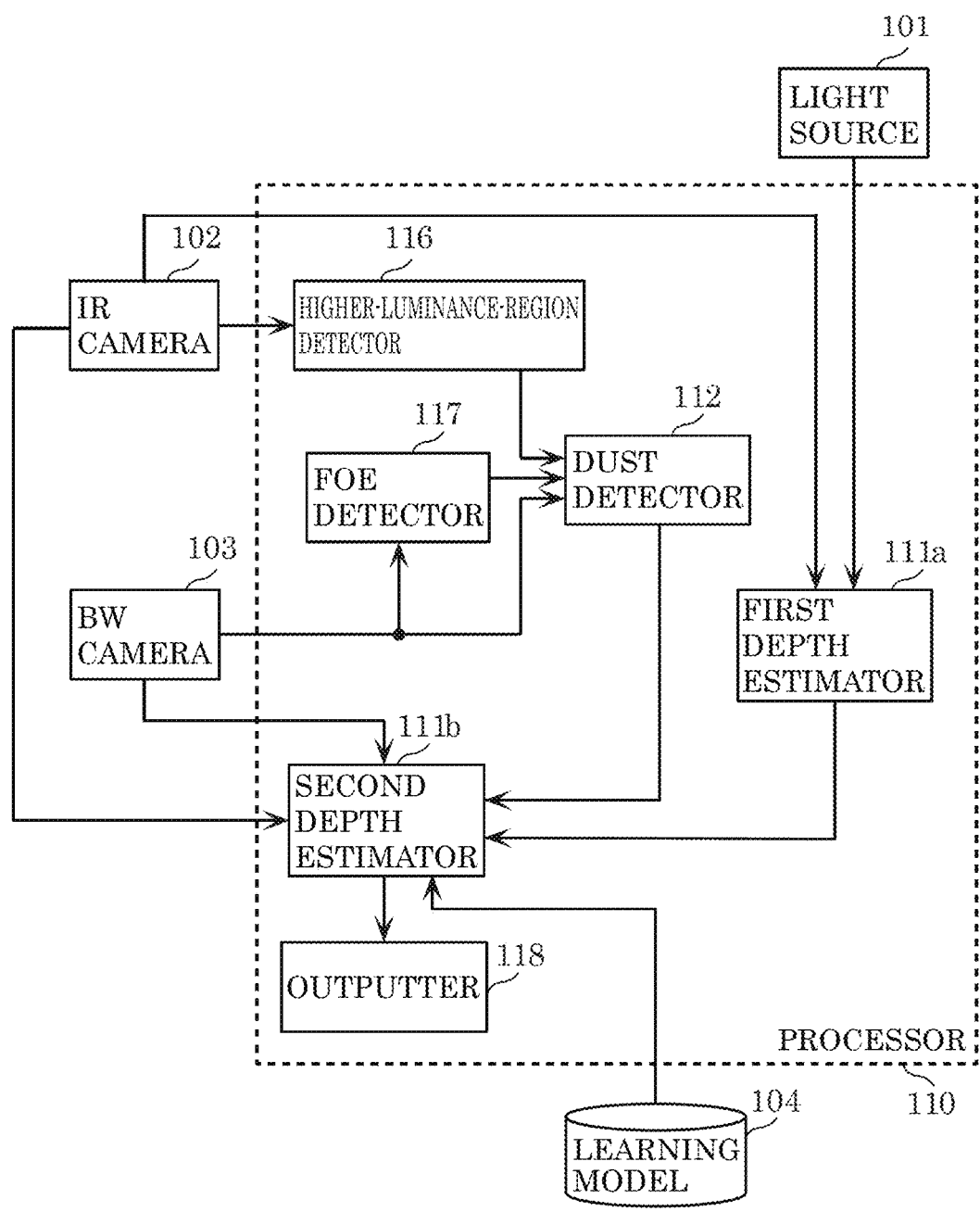
FIG. 26 is a block diagram illustrating an example of functional structure of a depth acquisition device in a variation of Embodiment.

FIG. 26 is a block diagram illustrating an example of the functional structure of depth acquisition device 1 according to this variation.

Depth acquisition device 1 in this variation includes each component shown in FIG. 8, and further includes learning model 104 including, for example, a neural network.

Second depth estimator 111b inputs three types of data: an IR image, a BW image, and first depth information, into learning model 104, and generates second depth information by using a dust region as a mask region to be corrected.

In the training of learning model 104, in addition to the IR image, the BW image, and the first depth information, a correct depth image is prepared in advance. Next, the IR image, the BW image, the first depth information, and the mask image that specifies a dust region are given to learning model 104 as input. Then, learning model 104 is trained so that the output from learning model 104 with respect to the input matches the correct depth image. It should be noted that at the time of training, mask images are randomly given. Second depth estimator 111b uses learning model 104 that has been trained in advance in this way. That is, second depth estimator 111b can acquire second depth information outputted from learning model 104 by inputting the IR image, the BW image, the first depth information, and the mask image that specifies the dust region to learning model 104.

In this way, in this variation, second depth estimator 111b estimates the depth information indicating the depth at each position in the IR image, and corrects the depth at each position in the dust area as indicated by its depth information by inputting the IR image, the BW image, the dust region, and the depth information thereof to the learning model. Therefore, if the learning model is trained in advance such that a correct depth at each position in the dust region is outputted for the inputs of the IR image, the BW image, the dust region, and the depth information, it is possible to appropriately correct the depth information estimated from the IR image. That is, it is possible to appropriately correct the depth at each position in the dust region indicated by the depth information.

As described above, second depth estimator 111b may use Deep Learning. In that case, it is not necessary to directly output the dust region, and the second depth information may be directly generated by Deep Learning.

Figure 27:
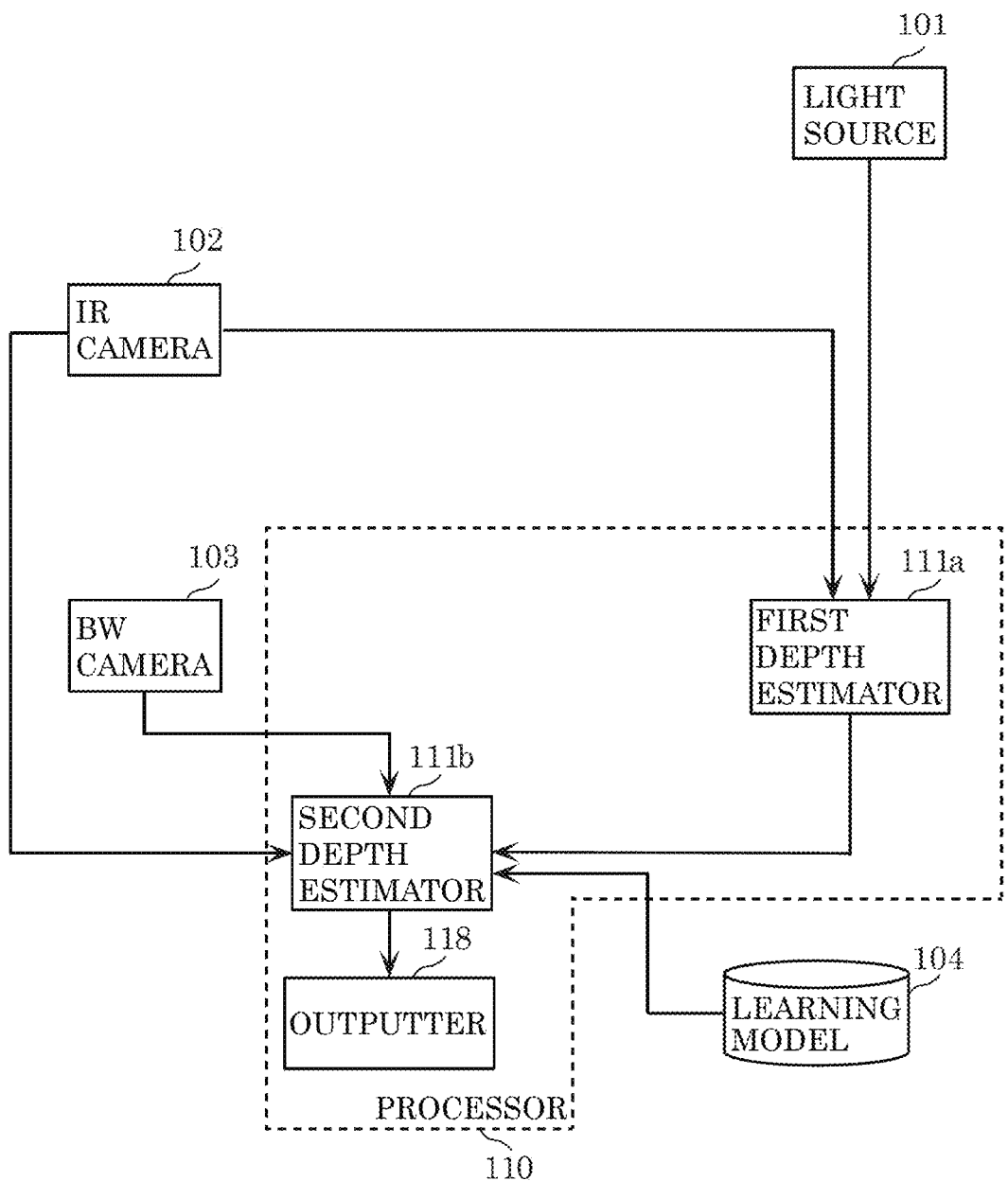
FIG. 27 is a block diagram illustrating another example of functional structure of a depth acquisition device in a variation of Embodiment.

FIG. 27 is a block diagram illustrating another example of a functional structure of depth acquisition device 1 according to this variation.

Depth acquisition device 1 in this variation does not include dust detector 112, higher-luminance-region detector 116, and FOE detector 117, and include components other than these among the components shown in FIG. 26.

In the training of learning model 104, a correct depth image is prepared in advance in addition to the IR image, the BW image, and the first depth information, as in the example shown in FIG. 26. Next, the IR image, the BW image, and the first depth information are given to learning model 104 as input. Then, learning model 104 is trained such that the output from learning model 104 with respect to the input matches the correct depth image. As learning model 104, a VGG-16 network to which Skip connection is added may be used as in Non Patent Literature (Caner Hazirbas, Laura Leal-Taixe and Daniel Cremers. Hazirbas, "Deep Depth From Focus", In ArXiv preprint arXiv, 1704.01085, 2017). The number of channels of learning model 104 is changed such that the IR image, the BW image, and the first depth information are given as inputs to that learning model 104. By using learning model 104 that has been trained in advance in this way, second depth estimator 111b can easily obtain second depth information from that learning model 104 by inputting the IR image, the BW image, and the first depth information to learning model 104.

That is, depth acquisition device 1 shown in FIG. 27 includes a memory and processor 110. It should be noted that the memory, though not shown in FIG. 27, may be provided in depth acquisition device 1 as shown in FIG. 5. Processor 110 acquires timing information indicating the timing at which light source 101 irradiates the subject with infrared light. Next, processor 110 acquires an IR image, which is obtained by imaging a scene including a subject with infrared light according to the timing indicated by the timing information, and is retained in a memory. Next, processor 110 acquires a BW image which is retained in a memory and obtained by imaging of a substantially same scene as that of the IR image, the imaging being performed with visible light at a substantially same viewpoint and imaging time as those of the IR image. Then, first depth estimator 111a of processor 110 estimates the depth information indicating the depth at each position in the IR image. By inputting the IR image, the BW image, and the depth information to learning model 104, second depth estimator 111b corrects the depth at each position in the dust region of the IR image indicated by the depth information.

Therefore, if learning model 104 is trained in advance such that a correct depth at each position in the dust region of the IR image is outputted for the inputs of the IR image, the BW image, and the depth information, it is possible to appropriately correct the depth information estimated from the IR image. That is, it is possible to appropriately correct the depth at each position in the dust region indicated by the depth information without detecting the dust region.

As described so far, in depth acquisition device 1 in the present embodiment and its variation, even when there is a dust region in the IR image, it is possible to acquire appropriate depth at each position in the dust region by using the image of the corresponding region of the BW image.

It is noted that in the above-described each embodiment, each component may be constituted by dedicated hardware or may be implemented by executing a software program suitable for each component. Each component may be implemented by a program executing unit, such as a CPU or a processor, reading and executing a software program recorded on a recording medium such as a hard disk or a semiconductor memory. Here, the software that implements the depth acquisition device and the like of the above-described embodiments and variations causes the computer to execute each step included in the flowchart of any of FIGS. 6, 7, and 21 to 25.

Although the depth acquisition device according to one or more aspects has been described above based on the embodiment and its variations, the present disclosure is not limited to this embodiment and its variations. Embodiments in which various modifications that can be conceived by those skilled in the art are applied to the present embodiment and its variations, and embodiments which are constructed by combining components in the present embodiment and its variations may be included within the scope of the present disclosure as long as they do not depart from the gist of the present disclosure.

For example, in the above-described embodiment and its variations, dust detector 112 detects a dust region, but it may detect a region other than the dust region as long as an object is projected as noise like dust on the region. For example, dust detector 112 may detect a rain region on which raindrops are projected or a snow region on which snowflakes are projected. In an environment where it is raining lightly, if the size of raindrop is sufficiently smaller than the resolution of the BW image acquired by BW camera 103 or BW image acquirer 115, the raindrops will not be reflected in the BW image. However, in an IR image acquired by IR camera 102 or IR image acquirer 114, the infrared light from light source 101 is reflected on raindrops and observed as high luminance. Therefore, in the first depth information or the first depth image generated by first depth estimator 111a, the depth of the rain region will become inappropriate. Similarly, in a snowfall environment, if the size of snowflake is sufficiently smaller than the resolution of the BW image acquired by BW camera 103 or BW image acquirer 115, the snowflakes will not be reflected in the BW image. However, in the IR image acquired by IR camera 102 or IR image acquirer 114, infrared light from light source 101 is reflected by the snowflakes and observed as high luminance. Therefore, in the first depth information or the first depth image generated by first depth estimator 111a, the depth of the snow region will become inappropriate. Therefore, dust detector 112 detects a rain region or a snow region by the same method as that for the detection of a dust region. Consequently, second depth estimator 111b uses a BW image, first depth information, and a region detected by dust detector 112 (that is, a rain region or a snow region) to generate second depth information. As a result of this, it is possible to acquire second depth information that is not affected by rain or snow. It is noted that the dust in the present disclosure includes solid particles such as dust, but is not limited to solid particles and may include liquid particles. For example, the dust in the present disclosure may include at least one type of dust, raindrops, and snowflakes.

It should also be noted that all or a part of the units and the devices according to the present disclosure or all or a part of the functional blocks in the block diagrams of FIGS. 1, 4, 5, 8, 26, and 27 may be implemented into one or more electronic circuits including a semiconductor device, a semiconductor Integrated Circuit (IC), or a Large Scale Integration (LSI). The LSI or the IC may be integrated into a single chip, or may be a combination of multiple chips. For example, the functional blocks except the storage element may be integrated into a single chip. Here, the LSI or the IC may be referred differently depending on the degree of integration, and may also be referred to as a system LSI, a Very Large Scale Integration (VLSI), or an Ultra Large Scale Integration (ULSI). A Field Programmable Gate Array (FPGA) which is programmable after manufacturing an LSI or a reconfigurable logic device capable of reconfiguring the connections or circuit segmentation in the LSI circuit may be used for the same purpose.

Furthermore, functions or operations of all or a part of the units, the devices, or a part of the devices may be realized by executing a software program. In this case, the software program is recorded on one or more nontransitory recording mediums such as a Read Only Memory (ROM), an optical disk, or a hard disk drive. When the software program is executed by a processor, the software program causes the processor and its peripheral devices to execute specific functions in the software program. The system or the device may include such one or more non-transitory recording medium on which the software program is recorded, a processor, and necessary hardware devices such as an interface.

INDUSTRIAL APPLICABILITY

The present disclosure is applicable to depth acquisition devices that acquire a depth of an image generated by imaging, for example, applicable to in-vehicle devices and the like.

What is claimed is:

1. A depth acquisition device, comprising:
a memory; and
a processor, wherein
the processor performs:
acquiring timing information indicating a timing at which a light source irradiates a subject with infrared light;
acquiring an infrared light image stored in the memory, the infrared light image being generated by imaging a scene including the subject with the infrared light according to the timing indicated by the timing information;
acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image;
detecting a dust region showing dust from the infrared light image; and
estimating a depth of the dust region based on the visible light image and the dust region,
in the detecting of the dust region, the processor performs detecting, as the dust region, a higher luminance region having a luminance not less than a first threshold in the infrared light image, when the higher luminance region satisfies a first condition which is predetermined, and
the first condition is that a center of gravity of the higher luminance region is located on a straight line or an arc, the straight line or the arc intersecting (i) a center of gravity of each of at least two higher luminance regions other than the higher luminance region in the infrared light image and (ii) a Focus of Expansion (FOE) of one of the infrared light image and the visible light image.

2. The depth acquisition device according to claim 1, wherein
in the estimating of the depth of the dust region, the processor performs:
estimating first depth information indicating a depth at each position in the infrared light image;
estimating second depth information indicating a corrected depth at each position in the dust region, the corrected depth being obtained by correcting, based on the visible light image, a depth at each position in the dust region which is indicated in the first depth information; and
generating third depth information indicating (i) a depth at each position in a region other than the dust region in the infrared light image which is indicated in the first depth information and (ii) a depth at each position in the dust region in the infrared light image which is indicated in the second depth information.

3. The depth acquisition device according to claim 1, wherein
in the detecting of the dust region, the processor performs detecting the higher luminance region as the dust region, when the higher luminance region further satisfies a second condition, which is predetermined.

4. The depth acquisition device according to claim 3, wherein
the second condition is that a luminance of a position in the visible light image is less than a second threshold, the position in the visible light image corresponding to a center of gravity of the higher luminance region in the infrared light image.

5. The depth acquisition device according to claim 3, wherein
the second condition is that a correlation coefficient between (i) a luminance in the higher luminance region in the infrared light image and (ii) a luminance in a region in the visible light image is less than a predetermined threshold, the region in the visible light image corresponding to the higher luminance region.

6. A depth acquisition device, comprising:
a memory; and
a processor, wherein
the processor performs:
acquiring timing information indicating a timing at which a light source irradiates a subject with infrared light;
acquiring an infrared light image stored in the memory, the infrared light image being generated by imaging a scene including the subject with the infrared light according to the timing indicated by the timing information;
acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image;
detecting a dust region showing dust from the infrared light image; and
estimating a depth of the dust region based on the visible light image and the dust region, in the detecting of the dust region, the processor:
performs principal component analysis on each pixel of a higher luminance region to detect a first principal component axis as a principal axis of the higher luminance region, the higher luminance region having a luminance not less than a first threshold in the infrared light image, and
performs detecting of the higher luminance region as the dust region, when the principal axis of the higher luminance region satisfies a first condition which is predetermined, and
the first condition is that one of the principle axis of the higher luminance region and a line extending from the principle axis intersects a Focus of Expansion (FOE) of the infrared light image.

7. A depth acquisition method, comprising:
acquiring timing information indicating a timing at which a light source irradiates a subject with infrared light;
acquiring an infrared light image stored in a memory, the infrared light image being generated by imaging a scene including the subject with the infrared light according to the timing indicated by the timing information;
acquiring a visible light image stored in the memory, the visible light image being generated by imaging a substantially same scene as the scene of the infrared light image, with visible light from a substantially same viewpoint as a viewpoint of the imaging the infrared light image at a substantially same time as an imaging time of imaging the infrared light image;
detecting a dust region showing dust from the infrared light image; and
estimating a depth of the dust region based on the visible light image and the dust region, wherein
in the detecting of the dust region, the processor performs detecting, as the dust region, a higher luminance region having a luminance not less than a first threshold in the infrared light image, when the higher luminance region satisfies a first condition which is predetermined, and
the first condition is that a center of gravity of the higher luminance region is located on a straight line or an arc, the straight line or the arc intersecting (i) a center of gravity of each of at least two higher luminance regions other than the higher luminance region in the infrared light image and (ii) a Focus of Expansion (FOE) of one of the infrared light image and the visible light image.

* * * * *